(12) United States Patent
Zhang et al.

(10) Patent No.: US 12,309,708 B2
(45) Date of Patent: May 20, 2025

(54) UPLINK POWER CONTROL TO ENHANCE PHYSICAL UPLINK CHANNEL RELIABILITY

(71) Applicant: APPLE INC., Cupertino, CA (US)

(72) Inventors: Yushu Zhang, Beijing (CN); Chunhai Yao, Beijing (CN); Chunxuan Ye, Cupertino, CA (US); Dawei Zhang, Cupertino, CA (US); Haitong Sun, Cupertino, CA (US); Hong He, Cupertino, CA (US); Huaning Niu, Cupertino, CA (US); Seyed Ali Akbar Fakoorian, Cupertino, CA (US); Sigen Ye, Cupertino, CA (US); Wei Zeng, Cupertino, CA (US); Weidong Yang, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 577 days.

(21) Appl. No.: 17/440,133

(22) PCT Filed: Jan. 8, 2021

(86) PCT No.: PCT/CN2021/070809
§ 371 (c)(1),
(2) Date: Sep. 16, 2021

(87) PCT Pub. No.: WO2022/147751
PCT Pub. Date: Jul. 14, 2022

(65) Prior Publication Data
US 2023/0097691 A1    Mar. 30, 2023

(51) Int. Cl.
*H04W 72/04* (2023.01)
*H04L 1/00* (2006.01)
(Continued)

(52) U.S. Cl.
CPC ......... *H04W 52/146* (2013.01); *H04W 52/08* (2013.01); *H04W 52/242* (2013.01); *H04W 52/325* (2013.01)

(58) Field of Classification Search
None
See application file for complete search history.

(56) References Cited

U.S. PATENT DOCUMENTS 9,667,386 B2 *  5/2017  Li ........................... H04L 1/189
10,484,141 B2 * 11/2019 Li ........................... H04L 1/189
(Continued)

FOREIGN PATENT DOCUMENTS

CN   111226469    6/2020
CN   111901870 A 11/2020
(Continued)

OTHER PUBLICATIONS

International Patent Application No. PCT/CN2021/070809, International Preliminary Report on Patentability, Jul. 20, 2023, 7 pages.
(Continued)

*Primary Examiner* — Tuan A Tran
(74) *Attorney, Agent, or Firm* — Kilpatrick Townsend & Stockton LLP

(57) ABSTRACT

The present application relates to devices and components including apparatus, systems, and methods for uplink power control for channels having repetitions.

28 Claims, 10 Drawing Sheets

(51) Int. Cl.
  *H04L 1/18*   (2023.01)
  *H04L 5/00*   (2006.01)
  *H04W 52/08*  (2009.01)
  *H04W 52/14*  (2009.01)
  *H04W 52/24*  (2009.01)
  *H04W 52/32*  (2009.01)

(56) References Cited

U.S. PATENT DOCUMENTS

| | | | |
|---|---|---|---|
| 10,660,044 | B2 | 5/2020 | Molavianjazi et al. |
| 10,694,472 | B2 | 6/2020 | Liu et al. |
| 10,708,866 | B2 * | 7/2020 | Papasakellariou .. H04W 52/146 |
| 10,966,162 | B2 * | 3/2021 | Yi ........................ H04W 72/21 |
| 11,316,621 | B2 * | 4/2022 | Li ............................. H04L 1/08 |
| 11,350,416 | B2 * | 5/2022 | Yang .................. H04W 52/325 |
| 11,729,803 | B2 * | 8/2023 | Xu ...................... H04W 72/046 |
| | | | 370/329 |
| 11,764,914 | B2 * | 9/2023 | Islam .................. H04L 5/0007 |
| | | | 370/329 |
| 11,937,247 | B2 * | 3/2024 | Jung .................... H04L 5/0053 |
| 2019/0313342 | A1 * | 10/2019 | Papasakellariou .. H04W 52/146 |
| 2020/0029335 | A1 * | 1/2020 | Yang .................... H04L 5/0094 |
| 2020/0177314 | A1 * | 6/2020 | Li ........................... H04L 1/189 |
| 2024/0022363 | A1 * | 1/2024 | Islam .................... H04W 72/23 |
| 2024/0032082 | A1 * | 1/2024 | Xu ......................... H04W 72/53 |

FOREIGN PATENT DOCUMENTS

| | | |
|---|---|---|
| WO | 2018205435 | 11/2018 |
| WO | 2020232164 A2 | 11/2020 |
| WO | 2020250403 A1 | 12/2020 |
| WO | 2020255401 A1 | 12/2020 |

OTHER PUBLICATIONS

International Patent Application No. PCT/CN2021/070809, International Search Report and Written Opinion, Mailed on Sep. 28, 2021, 10 pages.
3rd Generation Partnership Project; Technical Specification Group Radio Access Network; NR; Multiplexing and channel coding (Release 16), 3GPP Ts 38.212 V16.3.0, Sep. 2020, 152 pages.
3rd Generation Partnership Project; Technical Specification Group Radio Access Network; NR; Physical layer procedures for control (Release 16), 3GPP Ts 38.213 V16.3.0, Sep. 2020, 179 pages.
3rd Generation Partnership Project; Technical Specification Group Radio Access Network; NR; Medium Access Control (MAC) protocol specification (Release 16), 3GPP Ts 38.321 V16.3.0, Dec. 2020, 156 pages.
3rd Generation Partnership Project; Technical Specification Group Radio Access Network; NR; Radio Resource Control (RRC) protocol specification (Release 16), 3GPP Ts 38.331 V16.3.1, Jan. 2021, 932 pages.
Enhancements for Multi-TRP URLLC Schemes, Nokia, Nokia Shanghai Bell, 3GPP TSG RAN WG1 #103 Meeting, R1-2008904, Oct. 26-Nov. 13, 2020, 18 pages.
Enhancements on Multi-TRP for PDCCH, PUCCH and PUSCH, 3rd Generation Partnership Project Technical Specification Group Radio Access Network Working Group 1 Meeting #103-e, R1-2009251, Oct. 26-Nov. 13, 2020, 33 pages.
European Patent Application No. 21916807.7, Partial Supplementary European Search Report, Jul. 23, 2024, 18 pages.
Japan Patent Application No. 2023-541091, Office Action, Jun. 7, 2024, 12 pages.
European Patent Application No. 21916807.7, Extended European Search Report, Oct. 14, 2024, 15 pages.
Japan Patent Application No. 2023-541091, Office Action, Oct. 25, 2024, 6 pages.

* cited by examiner

UPLINK POWER CONTROL TO ENHANCE PHYSICAL UPLINK CHANNEL RELIABILITY

CROSS-REFERENCE TO RELATED APPLICATIONS

This application is a U.S. National Phase of International Application No. PCT/CN2021/070809, filed Jan. 8, 2021, the entire contents and disclosures of which is incorporated herein by reference.

BACKGROUND

Third Generation Partnership Project (3GPP) provides uplink power control to provide effective uplink communication while limiting interference and power consumption at the user equipment (UE). Power control parameters may be provided to the UE to control the uplink power. In Release 15 and Release 16 of 3GPP, the power control parameters are derived as follows. If spatial relation is configured, the power control parameters are configured within a spatial relation configuration. Spatial relation is only applicable to frequency range 2 (FR2), 24,250 megaHertz (MHz)-52,600 MHz. If spatial relation is not configured, default power control parameters may be selected from the first power control parameter in each power control parameter list configured by radio resource control (RRC) signaling.

DETAILED DESCRIPTION

Figure 1:
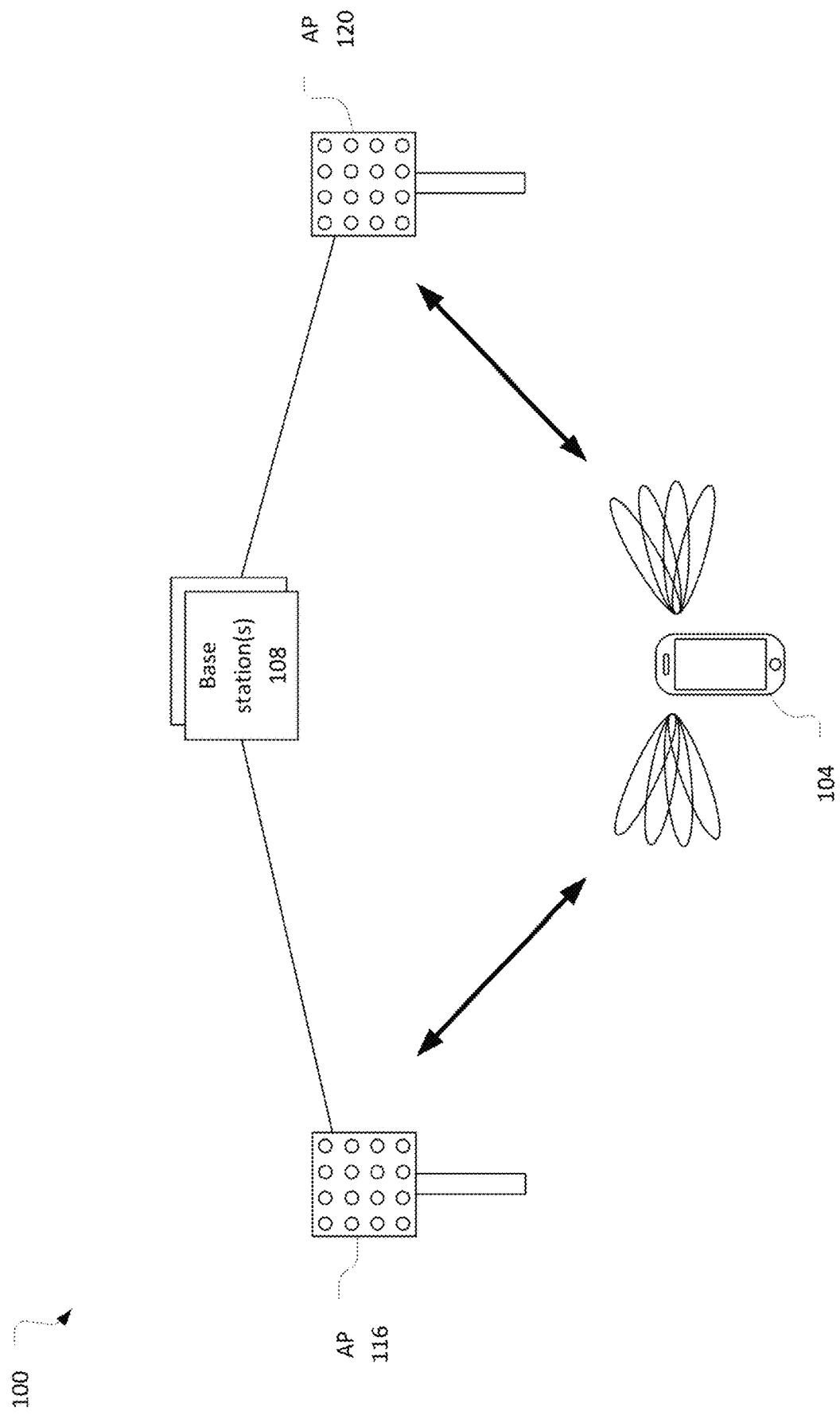
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104 and one or more base station(s) 108. The base station(s) 108 may provide one or more wireless serving cells, for example, 3GPP New Radio (NR) cells, through which the UE 104 may communicate with the base station(s) 108.

The UE 104 and the base station(s) 108 may communicate over an air interface compatible with 3GPP technical specifications such as those that define Fifth Generation (5G) NR system standards. The base station(s) 108 may include a next-generation-radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

The base station(s) 108 may be coupled with one or more distributed antenna panels (APs), for example, AP 116 and AP 120. The distributed APs 116/120 may be implemented in transmit-receive points (TRPs) or other devices. In general, the base station(s) 108 may perform the majority of the operations of a communication protocol stack, including scheduling, while the APs 116/120 act as distributed antennas. In some embodiments, the APs 116/120 may perform some lower-level operations of the communication protocol stack (for example, analog physical (PHY) layer operations).

The base station(s) 108 may use the APs 116/120 to geographically separate points at which a signal may be transmitted to, or received from, the UE 104. This may increase flexibility of using multiple-input, multiple-output and beamforming enhancements for communicating with the UE 104. The APs 116/120 may be used to transmit downlink transmissions to the UE 104 and receive uplink transmissions from the UE 104. In some embodiments, the distributed transmit/receive capabilities provided by the APs 116 and 120 may be used for coordinated multipoint or carrier aggregation systems from one or more base stations.

While the network environment 100 illustrates base station(s) 108 communicating with the UE 104 through APs 116/120, in various embodiments, the network environment 100 may include a number of other network elements (for example, base stations, TRPs, eNBs, etc.) to facilitate a radio access network connection for the UE 104.

The base station(s) 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface.

The APs 116 and one or more antenna panels on the UE 104 may include arrays of antenna elements that allow receive or transmit beamforming. Beamforming may improve the uplink and downlink budgets by determining and using uplink and downlink beams that increase antenna gain and overall system performance. The UE 104 and the base station 108 may determine desired uplink-downlink beam pairs using beam management operations based on reference signal measurements and channel reciprocity assumptions.

In the downlink direction, the base station 108 may send synchronization signal blocks (SSBs) and channel state information—reference signals (CSI-RSs) that are measured by the UE 104 to determine the desired downlink beam pair for transmitting/receiving physical downlink control channel (PDCCH) and physical downlink shared channel (PDSCH) transmissions. In some embodiments, the network elements may assume uplink/downlink beam correspondence and use the desired downlink beam pair as the desired uplink beam pair for physical uplink shared channel (PUSCH) and physical uplink control channel (PUCCH) transmissions. In some embodiments, beam pairs may be independently determined for the uplink direction based on sounding reference signals (SRSs) transmitted by the UE 104. In various embodiments, beam management may include different stages such as initial acquisition of the uplink and downlink beams, and later refinement of the uplink and downlink beams.

To improve reliability and coverage of a PUCCH transmission, the UE 104 may transmit a plurality of repetitions of the PUCCH transmission. The repetitions may be transmitted in the same or different slots. As used herein, each PUCCH transmission that includes the same information may be referred to as a repetition, even if the PUCCH transmission is the original or first PUCCH transmission.

The base station(s) 108 may control uplink transmit power of uplink channels by providing power control configuration information to the UE 104 using any combination of RRC signaling, MAC control element (CE) signaling, and downlink control information (DCI). The power control TS 38.213, the closed-loop power control process for the PUCCH may then operate by determining a TPC command accumulation, $g_{b,f,c}(i,l)$, as follows:

$$g_{b,f,c}(i,l)=g_{b,f,c}(i-i_0,l)+\Sigma_{m=0}^{C(C_i)-1}\delta_{PUCCH,b,f,c}(m,l), \quad \text{Eq. 1}$$

where $\delta_{PUCCH,b,f,c}(m, 1)$ represents the $m^{th}$ TPC command for adjustment state '1.' In some embodiments, a TPC command may include 2 bits where values of 0, 1, 2, and 3 respectively indicate commands to adjust power by −1 dB, 0 dB, 1 dB, and 3 dB. Some embodiments described below provide other TPC commands.

In some embodiments, the base station(s) 108 may transmit a PUCCH power control (PUCCH-PowerControl) information element (IE) to the UE 104 to configure the UE-specific parameters for power control of PUCCH. The PUCCH-PowerControl IE may be as follows:

```
PUCCH-PowerControl ::= SEQUENCE {
    deltaF-PUCCH-f0            INTEGER (-16..15)      OPTIONAL, -- Need R
    deltaF-PUCCH-f1            INTEGER (-16..15)      OPTIONAL, -- Need R
    deltaF-PUCCH-f2            INTEGER (-16..15)      OPTIONAL, -- Need R
    deltaF-PUCCH-f3            INTEGER (-16..15)      OPTIONAL, -- Need R
    deltaF-PUCCH-f4            INTEGER (-16..15)      OPTIONAL, -- Need R
    p0-Set                     SEQUENCE (SIZE (1..maxNrofPUCCH-P0-PerSet)) OF P0-
PUCCH                                                 OPTIONAL, -- Need M
    pathlossReferenceRSs       SEQUENCE (SIZE (1..maxNrofPUCCH-
PathlossReferenceRSs)) OF PUCCH-PathlossReferenceRS   OPTIONAL, -- Need M
    twoPUCCH-PC-AdjustmentStates  ENUMERATED {twoStates}  OPTIONAL, -- Need S
...}
P0-PUCCH ::=                   SEQUENCE {
    p0-PUCCH-Id                P0-PUCCH-Id,
    p0-PUCCH-Value             INTEGER (-16..15)
}
P0-PUCCH-Id ::=                INTEGER (1..8)
PathlossReferenceRSs-v1610 ::=     SEQUENCE (SIZE (1..maxNrofPUCCH-
PathlossReferenceRSsDiff-r16)) OF PUCCH-PathlossReferenceRS-r16
PUCCH-PathlossReferenceRS ::=      SEQUENCE {
    pucch-PathlossReferenceRS-Id   PUCCH-PathlossReferenceRS-Id,
    referenceSignal                CHOICE {
        ssb-Index                      SSB-Index,
        csi-RS-Index                   NZP-CSI-RS-ResourceId
    }
}
``` configuration information may configure power control parameters such as, but not limited to, POs (uplink power values in dBm), alphas (possible values of a pathloss compensation coefficient for uplink power control), pathloss reference signals (RSs), and closed-loop indices. The base station(s) 108 may separately control the uplink power control parameters for the different uplink channels including, for example, PUSCH, PUCCH, physical random access channel (PRACH), and sounding reference signal (SRS).

Power control for PUSCH may be performed in an open-loop manner or a closed-loop manner and may be similar to that described in section 7.1 of 3GPP Technical Specification (TS) 38.213 v16.3.0 (2020-09) except as otherwise described herein. Power control for PUCCH may be performed using the closed-loop manner and may be similar to that described in section 7.2 of 3GPP TS 38.213 except as otherwise described herein. A closed-loop power control process may be based on feedback received from the base station(s) 108 in the form of transmit power control (TPC) commands. The TPC commands may be transmitted to the UE 104 through DCI on the PDCCH.

In some embodiments, the base station(s) 108 may transmit the TPC command using DCI format 2_2. The DCI payload may signal an adjustment state to which the TPC command is to apply. As described in section 7.2.1 of 3GPP The fields of the PUCCH-PowerControl IE may be similar to that described in 3GPP TS 38.331 v16.2.0 (2020-09). The P0-PUCCH-Value field may include an uplink transmit power value (P0) for the PUCCH with a 1 decibel (dB) step size. The deltaF-PUCCH-f0 field may include a UE transmit power offset (deltaF) value for PUCCH format 0 (and other deltaF fields may likewise include deltaF values for corresponding PUCCH formats). The p0-Set field may include a set with dedicated P0 values for PUCCH (for example, P01, P02, . . . ). The pathlossReferenceRSs may provide a set of reference signals (for example, a channel state information-reference signal (CSI-RS) or synchronization signal block (SSB)) that the UE 104 is to measure for pathloss estimates for PUCCH power control.

In the event the UE 104 is not configured with a spatial relation configuration (for example, PUCCH-SpatialRelationInfo IE as shown below), the UE 104 may select the first instance of P0-PUCCH, for example, the instance having an identity '0.'

As mentioned above, spatial relation may be configured in FR2. The spatial relation setting for a PUCCH transmission and the parameters for PUCCH power control may be configured by the base station(s) 108 transmitting a PUCCH-SpatialRelationInfo IE to the UE 104. The PUCCH-SpatialRelationInfo IE may be as follows.

```
PUCCH-SpatialRelationInfo ::=      SEQUENCE {
    pucch-SpatialRelationInfoId        PUCCH-SpatialRelationInfoId,
    servingCellId                      ServCellIndex    OPTIONAL, -- Need S
    referenceSignal                    CHOICE {
        ssb-Index                          SSB-Index,
        csi-RS-Index                       NZP-CSI-RS-ResourceId,
        srs                                PUCCH-SRS
    },
    pucch-PathlossReferenceRS-Id       PUCCH-PathlossReferenceRS-Id,
    p0-PUCCH-Id                        P0-PUCCH-Id,
    closedLoopIndex                    ENUMERATED { i0, i1 }
}
```

The fields of the PUCCH-SpatialRelationInfo IE may be similar to that described in 3GPP TS 38.331. The pucch-PathlossReferenceRS-ID and the p0-PUCCH Id may point to specific instances of PUCCH-PathlossReferenceRS and P0-PUCCH defined in the PUCCH-PowerControl IE. The closedLoopIndex may identify a closed-loop power control process.

The base station(s) 108 may configure a list of spatial relations using PUCCH-SpatialRelationInfo IEs for each PUCCH resource. The base station(s) 108 may then select one or two of the configured spatial relations using a MAC CE. Two spatial relations may be allowed for Release 17 to support PUCCH reliability enhancement for FR2. This may allow the UE 104 to apply different beams to transmit different PUCCH repetitions to the same or different TRP.

The current state-of-the-art provides a number of challenges with respect to efficiently controlling the uplink transmit power control for a PUCCH transmission having a plurality of repetitions they could be carried by more than one beam and transmitted to more than one TRP. In general, at least three issues are not adequately addressed by the current state-of-the-art.

In a first issue, since spatial relation is not applicable to FR1, support for different power control parameters for different PUCCH repetitions may need to be defined.

In a second issue, if beam hopping is provided to support intra-slot multi-beam operation, different beams may be applied to different hops for a PUCCH transmission in the same slot. Thus, how to perform uplink power control in this scenario for communications in both FR1 and FR2 may need to be defined.

A third issue may relate to updating a closed-loop power control factor based on a TPC command indicated by DCI. For PUCCH/PUSCH reliability enhancements with repetitions, how to apply the TPC command for each repetition may need to be addressed for communications in both FR1 and FR2.

The following options are provided to provide PUCCH power control enhancement for FR1 as described in the first issue, for example.

In a first option, option 1, different default power control parameters may be applied to different PUCCH repetitions. As previously mentioned, different PUCCH repetitions may be transmitted to different TRPs. Thus, it may be advantageous to provide the system with flexibility to individually control uplink transmit power with respect to these different PUCCH repetitions. Option 1 may include at least two suboptions that may be used independently or in conjunction with one another.

In a first suboption, option 1-1, first parameters of a set may be applied to a first beam, while second parameters of the set may be applied to a second beam. For example, a P0-set configured by a PUCCH-PowerControl IE may include a plurality of P0s, including a first P0 and a second P0, and a plurality of pathlossReferenceRSs, including a first pathloss RS and a second pathloss RS. In option 1-1, the first P0 in the P0 set may be applied to the first beam and the second P0 in the P0 set may be applied to the second beam. Similarly, the first pathloss RS of the plurality of pathlossReferenceRSs may be applied to the first beam and the second pathloss RS of the plurality of pathlossReferenceRSs may be applied to the second beam.

In a second suboption, option 1-2, the base station(s) may configure additional sets of parameters, with the first parameter of each set being applied to a respective beam. For example, the PUCCH-Power-Control IE may configure the plurality of P0 sets and a plurality of pathlossReferenceRS sets. The first P0 in a first P0 set may be applied to the first beam, while a first P0 in a second P0 set may be applied to a second beam.

In some embodiments, if two closed-loop, power control processes are enabled for the PUCCH, different closed-loop power control process indices may be applied to different repetitions. This may provide the base station(s) 108 with flexibility as to whether different loops are desired for different PUCCH repetitions. In some instances, when multiple power control parameter sets are applied for PUCCH repetitions, the base station(s) 108 may enable the two closed-loop power control processes (for example, enabling the two adjustment states). For example, with respect to the closed-loop power control equation, equation 1, the value of l may be different in the two power control parameter sets. Therefore, a different g would be applied to different repetitions corresponding to each PC parameter set.

In other embodiments, the first closed-loop power control process may be applied regardless of whether to PUCCH closed-loop power control processes are enabled. For example, the first closed-loop power control process may be applied to all PUCCH repetitions, even if more than one closed-loop power control processes are enabled.

In some embodiments, option 1-2 may be enabled by updating the PUCCH-PowerControl IE as follows.

```
PUCCH-PowerControl ::=   SEQUENCE {
    deltaF-PUCCH-f0          INTEGER (-16..15)       OPTIONAL, -- Need R
    deltaF-PUCCH-f1          INTEGER (-16..15)       OPTIONAL, -- Need R
    deltaF-PUCCH-f2          INTEGER (-16..15)       OPTIONAL, -- Need R
    deltaF-PUCCH-f3          INTEGER (-16..15)       OPTIONAL, -- Need R
    deltaF-PUCCH-f4          INTEGER (-16..15)       OPTIONAL, -- Need R
```

```
    p0-Set                SEQUENCE (SIZE (1..maxNrofPUCCH-P0-PerSet)) OF P0-
PUCCH                                                        OPTIONAL, -- Need M
    p0-Set1               SEQUENCE (SIZE (1..maxNrofPUCCH-P0-PerSet)) OF P0-
PUCCH                                                        OPTIONAL, -- Need M
    pathlossReferenceRSs     SEQUENCE (SIZE (1..maxNrofPUCCH-
PathlossReferenceRSs)) OF PUCCH-PathlossReferenceRS   OPTIONAL, -- Need M
    pathlossReferenceRSs        SEQUENCE (SIZE (1..maxNrofPUCCH-
PathlossReferenceRSs)) OF PUCCH-PathlossReferenceRS   OPTIONAL, -- Need M
    twoPUCCH-PC-AdjustmentStates   ENUMERATED {twoStates}  OPTIONAL, -- Need S
...}
```

As can be seen by reference to the previous PUCCH-PowerControl IE, this PUCCH-PowerControl IE is updated to configure additional sets, such as, P0-Set1 and pathlossReferenceRSs1. Thus, a first P0 from P0-Set can be applied to a PUCCH repetition of a first beam and a first P0 from P0-Set1 can be applied to a PUCCH repetition of a second beam. Similarly, a pathloss RS from pathlossReferenceRS can be applied to the PUCCH repetition of the first beam and a pathloss RS from pathlossReferenceRS can be applied to the PUCCH repetition of the second beam. In other embodiments, additional/alternative power control (PC) parameter sets may be provided.

In some embodiments, the base station(s) 108 may configure the UE 104 with a mapping between PC parameter sets (including, for example, P0, pathloss RS, closed-loop index) and PUCCH repetitions. The mapping may be configured by RRC signaling, MAC CE, or DCI. In some embodiments, the mapping may be predefined in, for example, a 3GPP TS.

Figure 2:
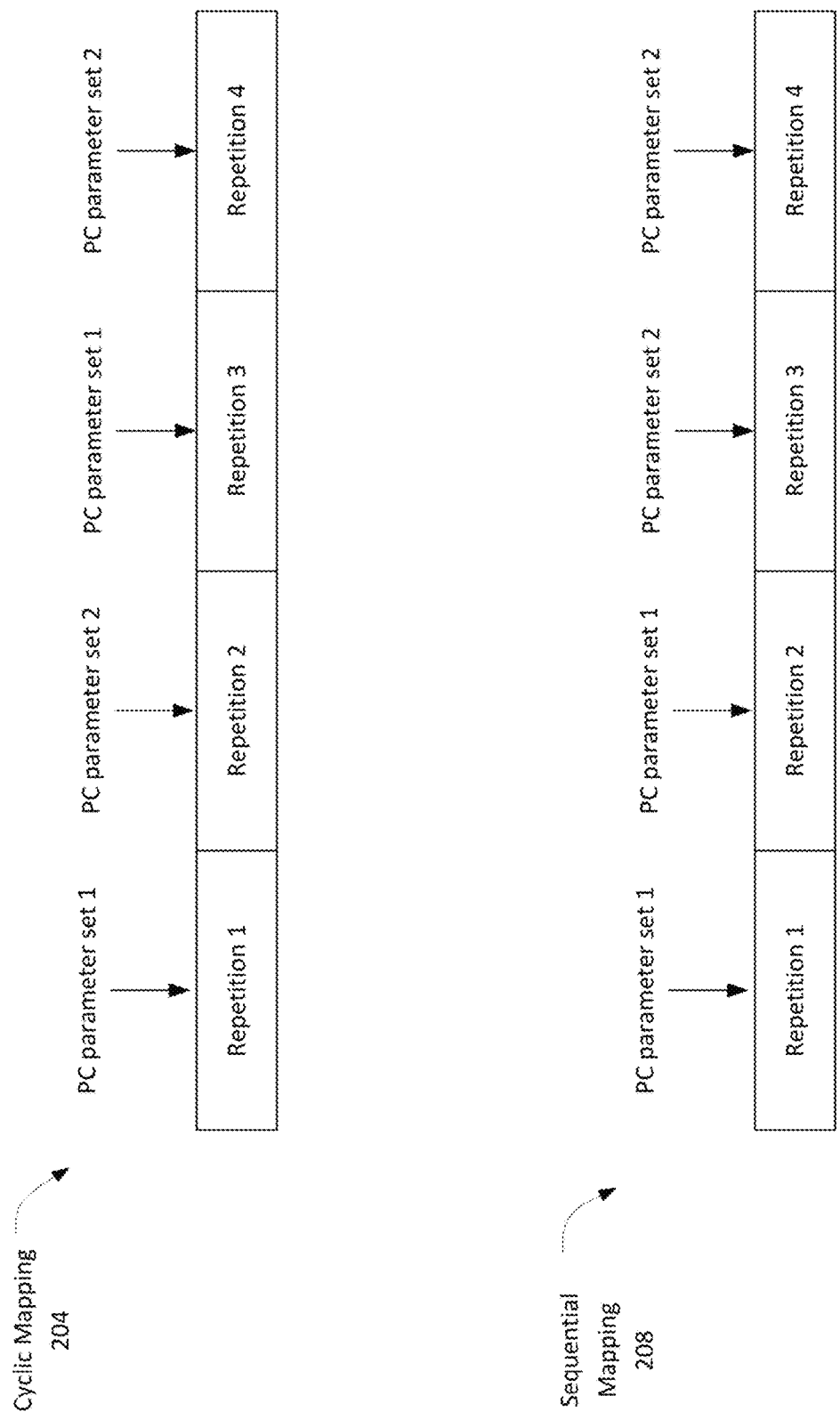
FIG. 2 includes power control parameter set to repetition mapping in accordance with some embodiments.

FIG. 2 illustrates two mapping schemes that may be used to map two parameter sets to four PUCCH repetitions in accordance with some embodiments. In particular, cyclic mapping 204 illustrates that the parameter sets are cycled through for consecutive PUCCH repetitions. For example, PC parameter set 1 is applied to repetition 1, PC parameter set 2 is applied to the next PUCCH repetition, repetition 2, PC parameter set 1 is applied to the next PUCCH repetition, repetition 3, and PC parameter set 2 is applied to the last PUCCH repetition of the set.

In sequential mapping 208, individual parameter sets may be mapped to consecutive PUCCH repetitions. For example, PC parameter set 1 may be mapped to PUCCH repetitions 1 and 2, then PC parameter set 2 is mapped to PUCCH repetitions 3 and 4.

In various embodiments, other numbers of PUCCH repetitions and PC parameter sets may be used by applying similar concepts.

In a second option, option 2, power control parameters for PUCCH resource without PUCCH-SpatialRelation IE (for example, in FR1) can be configured by higher layer signaling. For example, the base station(s) 108 may transmit configuration information via RRC signaling or MAC CE to configure the PUCCH power control parameters. Option 2 may include at least two suboptions that may be used independently or in conjunction with one another.

In a first suboption, option 2-1, one or two sets of power control parameters for a PUCCH resource can be configured by RRC. For example, the base station(s) may generate a PUCCH resource IE to configure a resource with one or more sets of power control parameters. A PUCCH resource IE with one set of power control parameters is shown as follows.

```
PUCCH-Resource ::=              SEQUENCE {
    pucch-ResourceId                PUCCH-ResourceId,
    startingPRB                     PRB-Id,
    intraSlotFrequencyHopping       ENUMERATED { enabled }
OPTIONAL, -- Need R
    secondHopPRB                    PRB-Id
OPTIONAL, -- Need R
    format                          CHOICE {
        format0                         PUCCH-format0,
        format1                         PUCCH-format1,
        format2                         PUCCH-format2,
        format3                         PUCCH-format3,
        format4                         PUCCH-format4
    }
    pucch-PathlossReferenceRS-Id        PUCCH-PathlossReferenceRS-Id,
    p0-PUCCH-Id                         P0-PUCCH-Id,
    closedLoopIndex                     ENUMERATED { i0, i1 }
}
```

The PUCCH-Resource IE may be a component of a PUCCH-Config IE. The fields of the PUCCH-Resource IE may be similar to that described in 3GPP TS 38.331; however, according to the present embodiment, the PUCCH-Resource IE may also include a PC parameter set with a PUCCH pathloss RS ID, P0-PUCCH ID, and a closed-loop index as shown.

A PUCCH resource IE with two sets of power control parameters is shown as follows.

```
PUCCH-Resource ::=              SEQUENCE {
    pucch-ResourceId                PUCCH-ResourceId,
    startingPRB                     PRB-Id,
```

-continued

```
  intraSlotFrequencyHopping           ENUMERATED { enabled }
OPTIONAL, -- Need R
  secondHopPRB                        PRB-Id
OPTIONAL, -- Need R
  format                              CHOICE {
    format0                             PUCCH-format0,
    format1                             PUCCH-format1,
    format2                             PUCCH-format2,
    format3                             PUCCH-format3,
    format4                             PUCCH-format4
  }
  pucch-PathlossReferenceRS-Id          PUCCH-PathlossReferenceRS-Id,
  p0-PUCCH-Id                         P0-PUCCH-Id,
  closedLoopIndex                     ENUMERATED { i0, i1 }
  pucch-PathlossReferenceRS-Id1         PUCCH-PathlossReferenceRS-Id,
  p0-PUCCH-Id1                        P0-PUCCH-Id,
  closedLoopIndex1                    ENUMERATED { i0, i1 }
}
```

This PUCCH resource IE may be similar to the one shown and discussed above; however, this PUCCH resource IE may also include a second PC parameter set with a PUCCH pathloss RS ID1, P0-PUCCH ID1, and a closed-loop index 1.

In this manner, the PUCCH resource may be used to configure one or two sets of power control parameters outside of a PUCCH spatial relation. This may give the base station(s) 108 more flexibility to choose different power control parameters for different PUCCH resources.

In a second suboption, suboption 2-2, some or all of the power control parameters for a PUCCH resource or a group of PUCCH resources can be configured by a MAC CE.

In some embodiments, suboption 2-1 may be used to provide the power control parameters before the MAC CE is received as an additional configuration. In some embodiments, the additional configuration may update the power control parameters originally configured, or may select one of a plurality of PC parameter sets to use for a particular resource.

In some embodiments, the MAC CE may update power control parameters for PUCCH resources in one or more serving cells. In some embodiments, the power control parameters may be updated for the serving cell that transmits the MAC CE or a different serving cell. In embodiments in which the MAC CE update power control parameters for PUCCH resources in a plurality of serving cells, it may do so by using a serving cell list that is either provided in the MAC CE itself or previously configured by RRC signaling.

For either suboption 2-1 or suboption 2-2, one or two sets of power control parameters may be applied for a PUCCH resource.

If one set of power control parameters is applied for a particular PUCCH resource, the base station(s) 108 may trigger N PUCCH resources (where N>1, for example, N=2) to report the same uplink control information (UCI). Therefore, each of the N PUCCH resources may be associated with its own set of power control parameters. In this manner, the different PUCCH resources that carry different PUCCH repetitions may have power control parameters suitable for the intended target TRP.

If two sets of power control parameters are applied for a particular PUCCH resource, the mapping of the PC parameter set to PUCCH repetitions may be predefined or configured by the base station(s) 108 using RRC signaling, MAC CE, or DCI. For example, similar to that described above with respect to FIG. 2, the PC parameter sets may be mapped to the PUCCH repetitions using cyclic mapping or sequential mapping.

In a third option, option 3, MPC parameter sets for a PUCCH resource without PUCCH-SpatialRelation can be configured by higher-layer signaling, for example, RRC signaling or MAC CE, where M>=2. DCI may then be used to select one or two sets from the MPC parameter sets for a PUCCH transmission.

Figure 3:
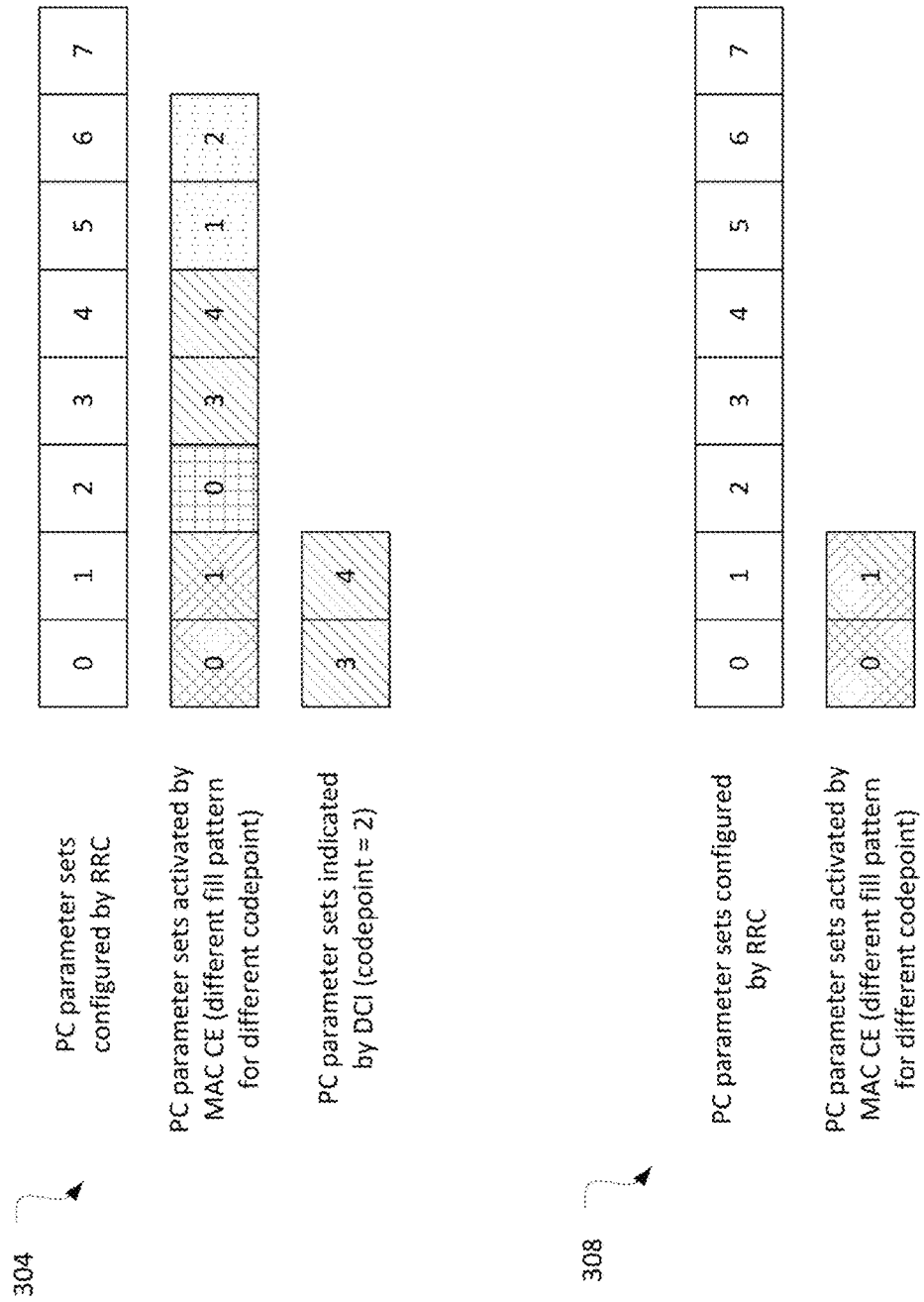
FIG. 3 illustrates two scenarios for signaling power control parameter sets in accordance with some embodiments.

FIG. 3 illustrates two scenarios for PC parameter set signaling in accordance with some embodiments. In scenario 304, the PC parameter set(s) may be provided by a combination of RRC, MAC CE, and DCI signaling. For example, the base station(s) 108 may configure the UE 104 with PC parameter sets (0-7) using RRC signaling (for example, M=8). Sometime thereafter, the base station(s) 108 may transmit a MAC CE to the UE 104 to activate a plurality of PC parameter sets. One or more activated PC parameter sets may correspond to each of a plurality of DCI codepoints. As shown, PC parameter sets 0 and 1 may correspond to a first DCI codepoint (for example, codepoint=0); PC parameter set 0 may correspond to a second DCI codepoint (for example, codepoint=1); PC parameter sets 3 and 4 may correspond to a third DCI codepoint (for example, codepoint=2); and PC parameter sets 0 and 1 may correspond to a fourth DCI codepoint (for example, codepoint=3). At a later time, the base station(s) 108 may transmit DCI with a DCI codepoint value corresponding to the PC parameter sets that should be applied to subsequent uplink transmissions. As shown, DCI codepoint=2 may be transmitted to select PC parameter sets 3 and 4.

In scenario 308, the PC parameter set(s) may be provided by RRC and MAC CE signaling. For example, the base station(s) 108 may configure the UE 104 with a plurality of PC parameter sets using RRC signaling similar to that described above. However, instead of the base station(s) 108 using a MAC CE to activate the PC parameter sets corresponding to a plurality of codepoints as described above, the MAC CE may only activate one or two PC parameter sets that correspond to one codepoint. Therefore, in this embodiment, DCI signaling is not needed to indicate the PC parameter sets that should be applied to a subsequent transmission.

If more than one PC parameter sets are selected for application, the parameter set to PUCCH repetition mapping may be similar to that described above. For example, the mapping may be predefined or provided by configuration signaling. The mapping may include cyclic mapping or sequential mapping.

Figure 4:
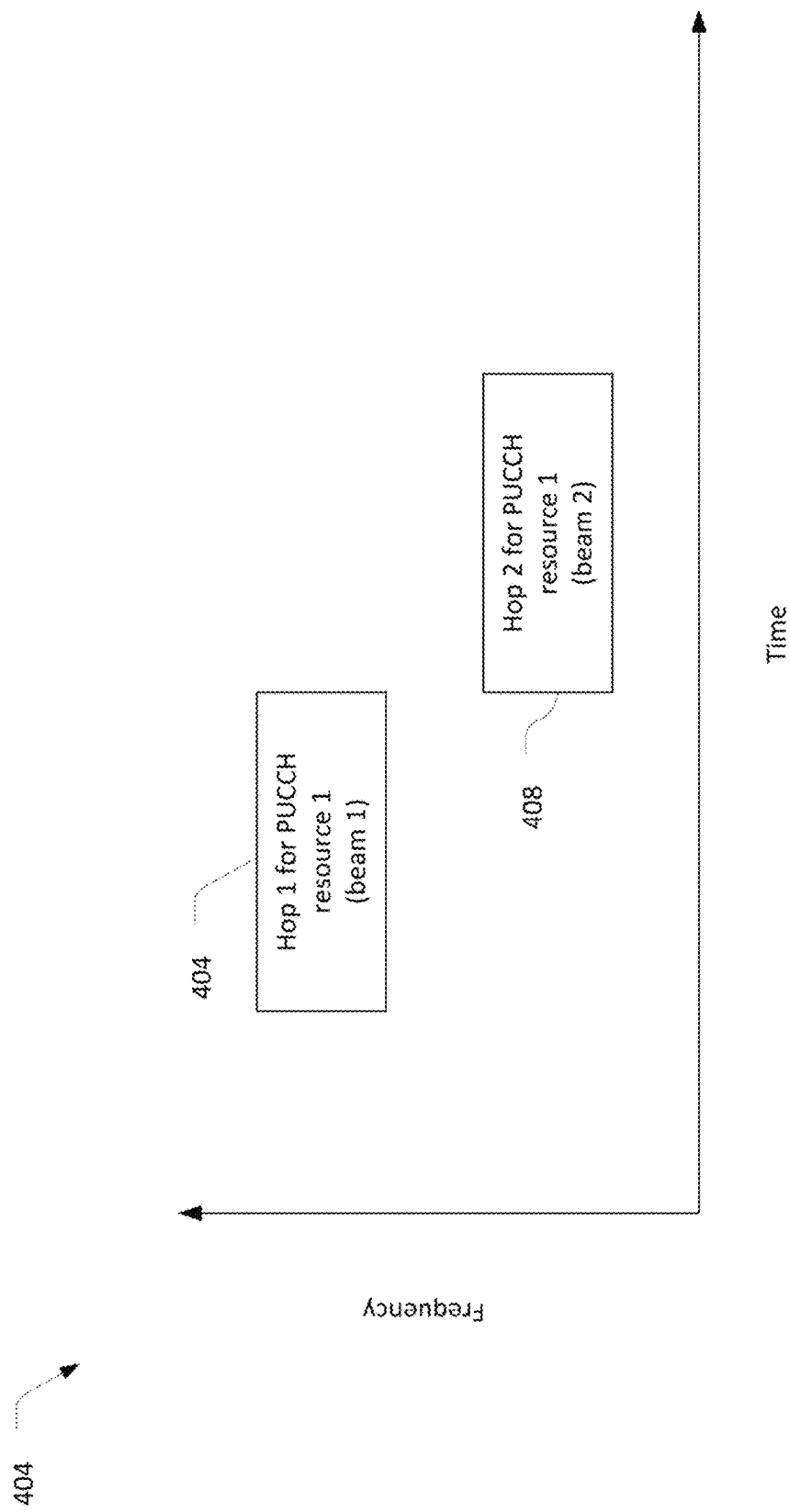
FIG. 4 illustrates intra-slot hopping in accordance with some embodiments.

FIG. 4 illustrates a signaling diagram 400 to illustrate PUCCH reliability enhancement using intra-slot beam hopping in accordance with some embodiments. The signaling diagram 400 includes a first PUCCH repetition 404 transmitted as a first hop for PUCCH resource 1 using beam 1; and a second PUCCH repetition 408 transmitted as a second hop for PUCCH resource 1 using beam 2. The first and second hops may be transmitted in the same slot to the same or different TRPs.

Power control may be applied to the hops that carry the PUCCH repetitions 404 and 408 differently based on whether or not spatial relation configurations are provided for the PUCCH resource.

In a first option for embodiments in which spatial relation configurations are provided for the PUCCH resource, different power control parameters corresponding to different PUCCH spatial relation configurations can be applied to each hop. For example, power control parameters from a first spatial relation configuration may be applied to the PUCCH repetition 404 (hop 1) and the power control parameters from a second spatial relation configuration may be applied to the PUCCH repetition 408 (hop 2). The power control may be performed per N symbols within a transmission occasion (for example, per hop).

In some embodiments, a gap between hops may be provided to facilitate an uplink power adjustment at the UE 104. The gap may be based on a power transition delay associated with the UE 104 in particular or in general. In some embodiments, the gap may be predefined or configured by the base station(s) 108 or reported by the UE 104. For example, the UE 104 may report a capability of the UE 104 and the base station(s) 108 may configure the gap accordingly.

In a second option for embodiments in which spatial relation configurations are provided for the PUCCH resource, the power control parameters corresponding to one of the PUCCH spatial relation configurations may be applied to both hops. In this embodiment, both PUCCH repetitions 404 and 408 may be transmitted to the same TRP with the same power, even though they are transmitted by different beams. The power control may still be performed per transmission occasion (for example, per hop). The PUCCH spatial relation configuration to be applied to the hops may be predefined. For example, the PUCCH spatial relation configuration having a lowest or highest ID may be applied. In other embodiments, the PUCCH spatial relation configuration to be applied to the hops may be configured by the base station(s) 108 using RRC signaling or MAC CE.

In a third option for embodiments in which spatial relation configurations are provided for the PUCCH resource, a common set of power control parameters may be applied to both hops. The common set of power control parameters, which may be configured by RRC, MAC CE, or DCI, may override any PC parameters in spatial relation.

In a first option for embodiments in which spatial relation configurations are not provided for a PUCCH resource (for example, in FR1), different sets of power control parameters may be applied to each hop. In some embodiments, the different sets of power control parameters may be configured to the PUCCH resource in a manner similar to that described above. The first set of the PC parameter sets may be applied to the first hop with PUCCH repetition 404 and the second set of the PC parameter sets may be applied to the second hop with PUCCH repetition 408.

In the event that more than two hops are supported, the PC parameter set to hop mapping may be similar to that described above with respect to the PC parameter set to repetition mapping. For example, the set-to-hop mapping may be predefined or configured by RRC signaling, MAC CE, or DCI. In some embodiments, the set-to-hop mapping may be based on cyclic mapping or sequential mapping similar to that shown and described with respect to FIG. 2.

Power control may be performed per hop. In some embodiments, a gap may be predefined or configured by the base station(s) 108 to accommodate power-transition delay of the UE 104. In some embodiments, the gap may be based on a UE report that requests or otherwise indicates a desired gap size to accommodate the power transition.

In a second option for embodiments in which spatial relation configurations are not provided for a PUCCH resource, a common set of power control parameters may be applied to a plurality of hops including, for example, the first hop with PUCCH repetition 404 and the second hop with PUCCH repetition 408. The common set of power control parameters may be configured by RRC signaling, MAC CE, or DCI.

To address the third issue mentioned above, the TPC command in DCI may be applied for the PUCCH with repetitions with a corresponding power control process. The PUCCH repetitions may be based on the same closed-loop PC process or on different closed-loop PC processes.

If the PUCCH repetitions are based on the same closed-loop PC process, the TPC command may be applied to all the PUCCH repetitions for the configured closed-loop PC process. In some embodiments, as a further extension, a common closed-loop PC process may be applied for a PUCCH resource with repetitions.

If the PUCCH repetitions correspond to different closed-loop PC processes, one of at least four options may be used. For discussion of these options, consider an example in which PUCCH repetition 1 is associated with a PC parameter set with a first closed-loop index; and PUCCH repetition 2 is associated with a PC parameter set with a second closed-loop index.

In a first option, the TPC command may be applied for one of the closed-loop PC processes. The closed-loop PC process to which the TPC command may be applied may be predefined or configured by RRC signaling, MAC CE, or DCI. Thus, if the received TPC command is associated with a closed-loop PC process having the second closed-loop index, the UE 104 may apply the power control factor indicated by the TPC command to the PUCCH repetition 2.

In a second option, the TPC command may be applied for both closed-loop PC processes with the same indicated value. Thus, the UE 104 may apply the power control factor indicated by a TPC command to both PUCCH repetitions 1 and 2.

In a third option, the indication of a TPC command can be configured by higher-layer signaling such as, for example, RRC signaling or MAC CE. In one example, a MAC CE can configure the applied closed-loop PC process(es) or value for the closed-loop PC factor(s) for each TPC command. For example, for a two-bit TPC command, the MAC CE may provide an indication for four states, for example, {0 dB, 0 dB}, {1 dB, 3 dB}, {3 dB, 3 dB}, and {−1 dB, 0 dB}. The first value in the pair of values may be configured to correspond to a first closed-loop PC process and the second value in the pair of values may correspond to the second closed-loop PC process. These four states configured by the MAC CE may correspond to TPC commands 0, 1, 2, and 3. If the base station(s) 108 transmits a TPC command of '1,' the UE 104 may apply a 1 dB adjustment to the first PUCCH repetition associated with the first closed-loop PC process and a 3 dB adjustment to the second PUCCH repetition associated with the second closed-loop PC process.

In some embodiments, the MAC CE may support cross-serving cell configuration. For example, the MAC CE may be received in a first serving cell and may configure TPC commands in a second serving cell.

In a fourth option, the TPC command indication may be predefined. For example, in some embodiments the TPC command indication may be predefined as indicated in Table 1.

TABLE 1

| TPC command field | Closed-loop factor for process 1 | Closed-loop factor for process 2 |
| --- | --- | --- |
| 0 | −1 dB | −1 dB |
| 1 | 0 dB | 0 dB |
| 2 | 1 dB | 0 dB |
| 3 | 3 dB | 1 dB |

In this manner, the base station(s) may transmit a TPC command value of, for example, 2, to indicate that the UE is to apply a 1 dB adjustment to PUCCH repetition 1 and a 0 dB adjustment to PUCCH repetition 2.

In some embodiments, the TPC command indications that are predefined by, for example, Table 1, may be default values that may be overridden by a subsequent MAC CE configuration such as that described above with respect to the third option.

In other embodiments, additional bits may be added for a TPC command for the fourth option. An RRC parameter may be introduced to enable the DCI format to accommodate such a TPC command.

Figure 5:
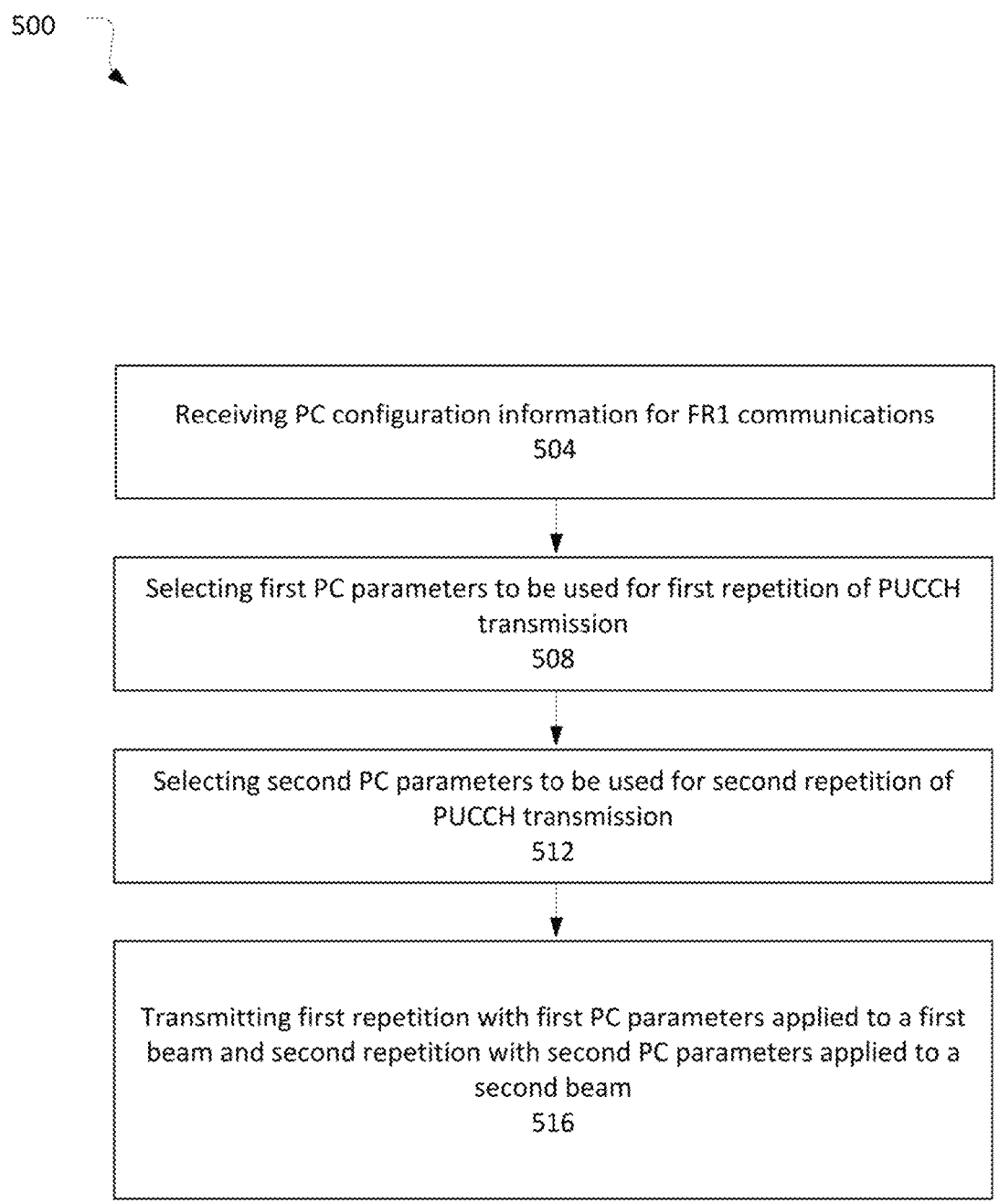
FIG. 5 illustrates an operational flow/algorithmic structure in accordance with some embodiments.

FIG. 5 illustrates an operation flow/algorithmic structure 500 in accordance with some embodiments. The operation flow/algorithmic structure 500 may be performed or implemented by a UE such as, for example, UE 104 or UE 900; or components thereof, for example, baseband processor 904A.

The operation flow/algorithmic structure 500 may include, at 504, receiving PC configuration information for FR1 communications. In some embodiments, the PC configuration information may be received in one or more PUCCH resource configurations, for example, PUCCH-Resource IEs; or one or more PUCCH power control configurations, for example, PUCCH-PowerControl. In various embodiments, the PC configuration information may be received via one or more control signaling layers. For example, the PC configuration information may be transmitted by RRC signaling, MAC CE, or DCI. As described elsewhere herein, some embodiments include transmission of the PC configuration information using a combination of different control signals. For example, RRC signaling may be used to initially configure PC parameters, while MAC CE or DCI may be used to update PC parameters or provide a more detailed instruction as to which of the configured PC parameters are to be used for an uplink transmission.

The PC configuration information may be configured to one PUCCH resource or a group of PUCCH resources. The PUCCH resource(s) may be in the same serving cell in which the PC configuration information is transmitted, or in a different serving cell.

The PC configuration information may configure a plurality of PC parameters including, for example, P0s, pathloss RSs, and closed-loop indices. These parameters may be configured in one or more sets or subsets. For example, in one embodiment the PC parameters may include a P0 set and a plurality of pathloss RSs. In another embodiment, a plurality of PC parameters sets may be configured, with individual PC parameter sets including P0 sets and a list of pathloss RSs.

The operation flow/algorithmic structure 500 may further include, at 508, selecting first PC parameters to be used for first repetition of PUCCH transmission and, at 512, selecting second PC parameters to be used for second repetition of the PUCCH transmission. Determining which PC parameters are to be applied to the different repetitions may be accomplished as described with respect to any of the embodiments described herein. For example, a first P0 of P0 set may be applied to the first repetition while a second P0 of the P0 set may be applied to the second repetition; a first P0 of a P0 set of a first PC parameter list may be applied to the first repetition while a first P0 of a P0 set of a second PC parameter list may be applied to the second repetition; etc. The pathloss RS to be applied to the different repetitions may also be selected in a manner similar to the P0 value.

In some embodiments, when more than one PC parameter set is configured, the individual PC parameters sets may be mapped to individual repetitions using a cyclic or sequential mapping pattern. In some embodiments, the mapping of the PC parameter sets to the PUCCH repetitions may be predefined or based on gNB signaling (for example, RRC signaling, MAC CE, or DCI).

The operation flow/algorithmic structure 500 may further include, at 516, transmitting the first repetition with first PC parameters applied to first beam and second repetition with second PC parameters applied to a second beam. In some embodiments, the first repetition may be transmitted to a first TRP using the first beam and the second repetition may be transmitted to a second TRP using the second beam. Providing the flexibility to adapt the power control parameters applied to each of these repetitions may increase both the reliability and efficiency of the transmission.

Figure 6:
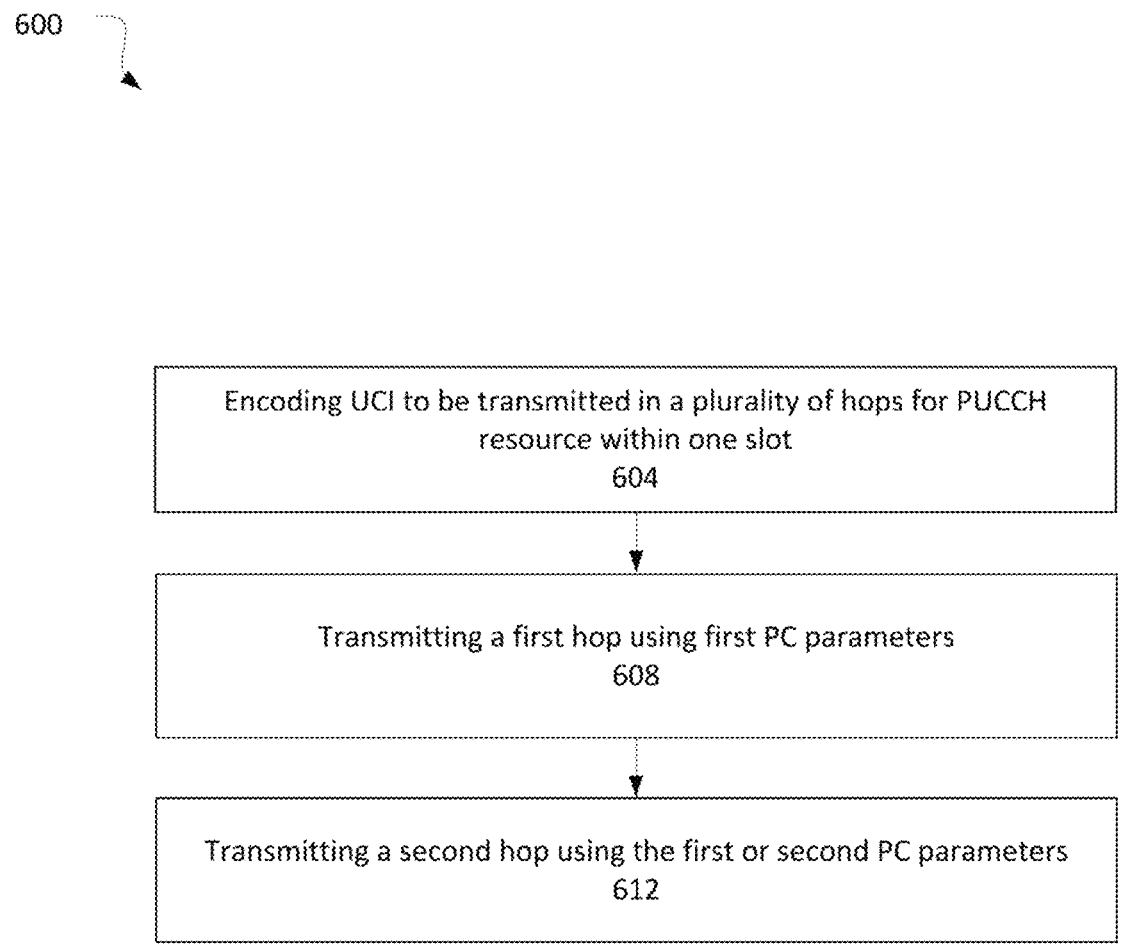
FIG. 6 illustrates another operational flow/algorithmic structure in accordance with some embodiments.

FIG. 6 illustrates an operation flow/algorithmic structure 600 in accordance with some embodiments. The operation flow/algorithmic structure 600 may be performed or implemented by a UE such as, for example, UE 104 or UE 900; or components thereof, for example, baseband processor 904A.

The operation flow/algorithmic structure 600 may include, at 604, encoding UCI to be transmitted in a plurality of hops for a PUCCH resource within one slot. In some embodiments, a gap in time between consecutive hops may be provided to accommodate power transitions that may be performed by the UE for example in the event uplink transmit power is different for the different hops. This gap may be predefined or configured by a gNB.

The same UCI may be transmitted in each of the plurality of hops of a slot. This intra-slot beam hopping may enhance the reliability of the UCI carried in the PUCCH resource.

In some embodiments, spatial relation configuration information may be provided. This configuration information may be provided if the PUCCH resource is in FR2, for example. One or more spatial relation configurations may provide one or more PC parameters.

In other embodiments, spatial relation configuration information may not be provided. This may be the case if the PUCCH resource is in FR1. In various embodiments, one or more power control parameters may be configured per PUCCH resource.

In some embodiments, whether or not the spatial relation configuration information is provided, a common set of power control parameters may be configured.

The operation flow/algorithmic structure 600 may further include, at 608, transmitting the first hop using the first PC parameters and, at 612, transmitting the second hop using the first or second PC parameters. In the event that a common set of power control parameters are provided, the first PC parameters may be considered the common set and may be applied to both the first and second hop.

In some embodiments, PC parameters may be received in first and second spatial relation configurations provided for the PUCCH resource. The UE may apply PC parameters provided by one of the spatial relation configurations (the "first power control parameters" described at 608 and 612) to both first and second hops; or may apply first PC parameters provided by a first spatial relation configuration to the first hop and second PC parameters provided by a second spatial relation configuration to the second hop.

In embodiments in which spatial relation is not configured, the UE may be configured with a plurality of sets of PC parameters for a PUCCH resource with repetitions. In some embodiments, the first PC parameters may be from a first set of PC parameters and the second PC parameters may be from a second set of PC parameters.

Figure 7:
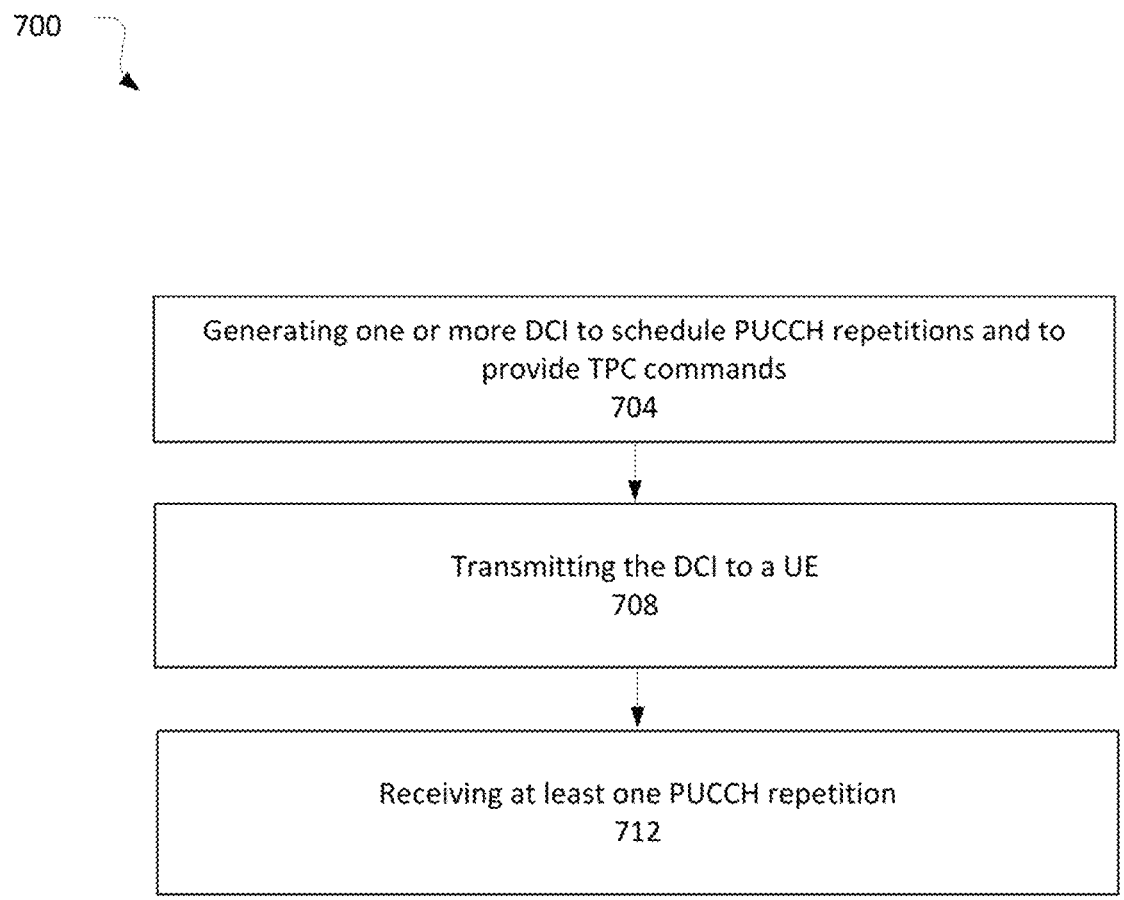
FIG. 7 illustrates another operational flow/algorithmic structure in accordance with some embodiments.

FIG. 7 illustrates an operation flow/algorithmic structure 700 in accordance with some embodiments. The operation flow/algorithmic structure 700 may be performed or implemented by a base station such as, for example, base station(s) 104-108 or gNB 1000; or components thereof, for example, baseband processor 1004A.

The operation flow/algorithmic structure 700 may include, at 704, generating one or more DCI to schedule PUCCH repetitions and to provide TPC commands. In some embodiments, one DCI may both schedule the PUCCH repetitions and provide the TPC commands. In other embodiments, a first DCI may schedule the PUCCH repetitions and a second DCI may provide the TPC commands.

The PUCCH repetitions may be associated with one or more closed-loop PC processes. The TPC command may be an instruction to adjust an uplink power associated with closed-loop PC processes. In the event the plurality of repetitions are associated with one closed-loop PC process, the TPC command may be applied to all of the repetitions. If the repetitions are respectively associated with closed-loop PC processes, the TPC command may: provide one factor to be applied for one of the processes/repetitions; provide one factor to be applied to all (or a subset) of the processes; or may provide a plurality of factors to be respectively applied to the plurality of processes/repetitions. In some embodiments, to provide a plurality of factors to be respectively applied to a plurality of processes/repetitions, the TPC command may be a one or two bits command that references configured codepoints that corresponds to pairs of values for the closed-loop power control factors. The correspondence may be predefined by a 3GPP TS, for example, or configured by RRC or MAC CE.

The operation flow/algorithmic structure 700 may further include, at 708, transmitting the one or more DCI to the UE. The DCI may be transmitted in a PDCCH from one or more TRPs.

The operation flow/algorithmic structure 700 may further include, at 712, receiving at least one PUCCH repetition. The PUCCH repetition may be transmitted from the UE with uplink transmit power based on the TPC command. In some embodiments, a plurality of PUCCH repetitions may be received by one or more TRPs. These repetitions may be transmitted to the different TRPs using different beams.

Figure 8:
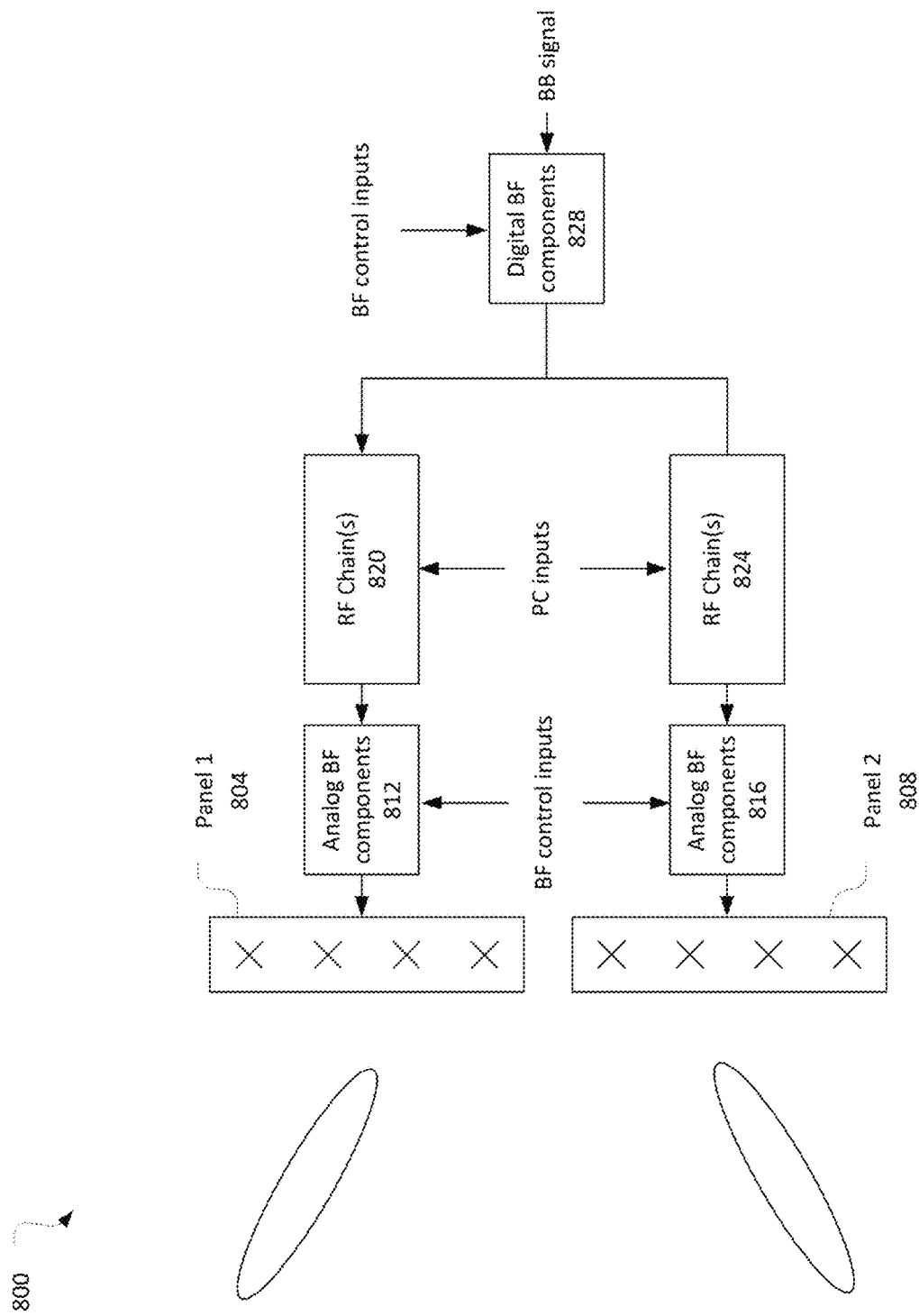
FIG. 8 illustrates beamforming components of a device in accordance with some embodiments.

FIG. 8 illustrates beamforming circuitry 800 in accordance with some embodiments. The beamforming circuitry 800 may include a first antenna panel, panel 1 804, and a second antenna panel, panel 2 808. Each antenna panel may include a number of antenna elements. Other embodiments may include other numbers of antenna panels.

Digital beamforming (BF) components 828 may receive an input baseband (BB) signal from, for example, a baseband processor. The digital BF components 828 may rely on complex weights to pre-code the BB signal and provide a beamformed BB signal to parallel radio frequency (RF) chains 820/824.

Each RF chain 820/824 may include a digital-to-analog converter to convert the BB signal into the analog domain; a mixer to mix the baseband signal to an RF signal; and a power amplifier to amplify the RF signal for transmission. The RF chains 820/824 may receive PC inputs to individually adjust the uplink transmit power control for different beams as described herein.

The RF signal may be provided to analog BF components 812/816, which may apply additionally beamforming by providing phase shifts in the analog domain. The RF signals may then be provided to antenna panels 804/808 for transmission.

In some embodiments, instead of the hybrid beamforming shown here, the beamforming may be done solely in the digital domain or solely in the analog domain.

In various embodiments, control circuitry, which may reside in a baseband processor, may provide BF weights to the analog/digital BF components to provide a transmit beam at respective antenna panels. These BF weights may be determined by the control circuitry to provide the directional provisioning of the serving cells as described herein. In some embodiments, the BF components and antenna panels may operate together to provide a dynamic phased-array that is capable of directing the beams in the desired direction.

Figure 9:
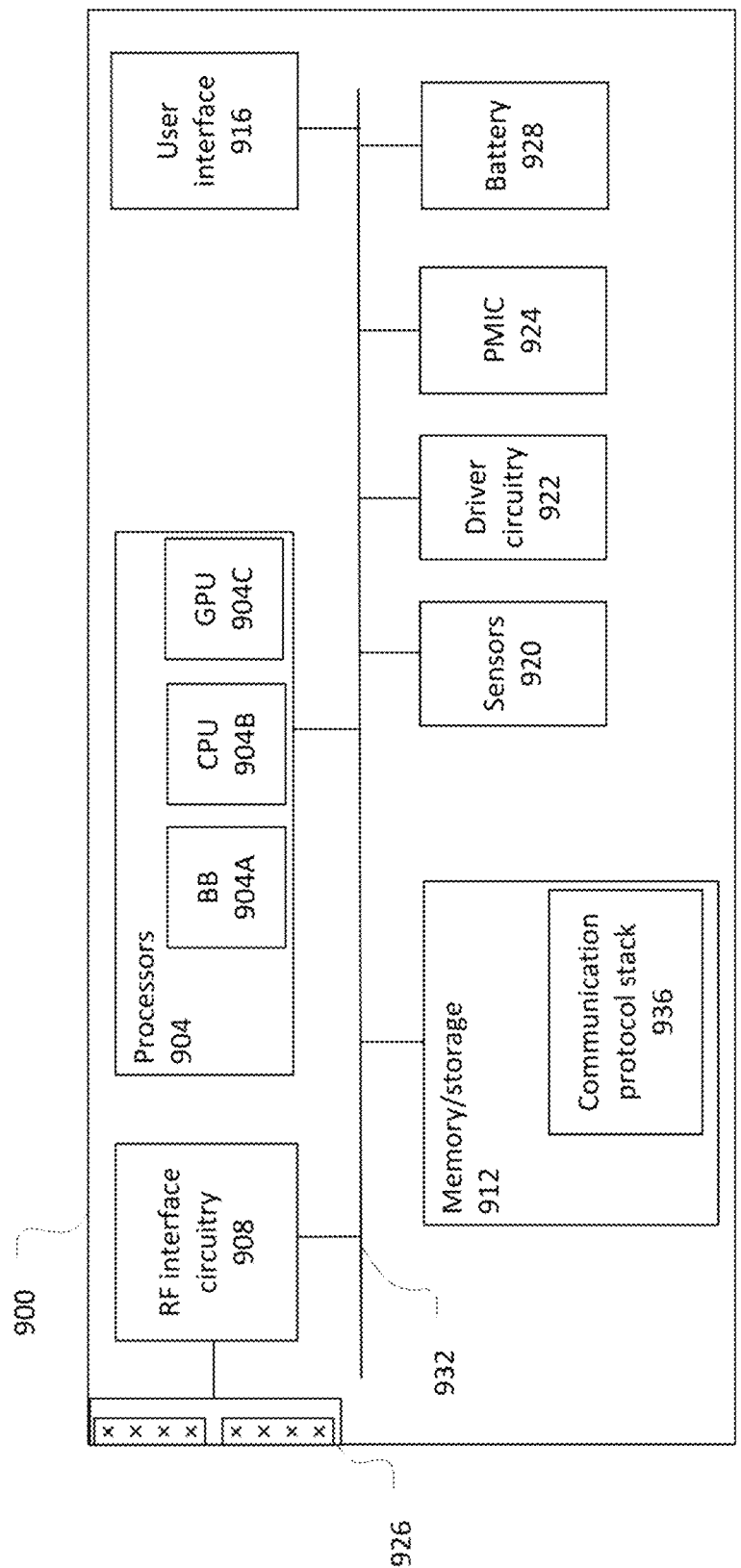
FIG. 9 illustrates a user equipment in accordance with some embodiments.

FIG. 9 illustrates a UE 900 in accordance with some embodiments. The UE 900 may be similar to and substantially interchangeable with UE 104 of FIG. 1.

The UE 900 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 900 may include processors 904, RF interface circuitry 908, memory/storage 912, user interface 916, sensors 920, driver circuitry 922, power management integrated circuit (PMIC) 924, antenna structure 926, and battery 928. The components of the UE 900 may be implemented as integrated circuits (ICs), portions thereof, discrete electronic devices, or other modules, logic, hardware, software, firmware, or a combination thereof. The block diagram of FIG. 9 is intended to show a high-level view of some of the components of the UE 900. However, some of the components shown may be omitted, additional components may be present, and different arrangement of the components shown may occur in other implementations.

The components of the UE 900 may be coupled with various other components over one or more interconnects 932, which may represent any type of interface, input/output, bus (local, system, or expansion), transmission line, trace, optical connection, etc. that allows various circuit components (on common or different chips or chipsets) to interact with one another.

The processors 904 may include processor circuitry such as, for example, baseband processor circuitry (BB) 904A, central processor unit circuitry (CPU) 904B, and graphics processor unit circuitry (GPU) 904C. The processors 904 may include any type of circuitry or processor circuitry that executes or otherwise operates computer-executable instructions, such as program code, software modules, or functional processes from memory/storage 912 to cause the UE 900 to perform operations as described herein.

In some embodiments, the baseband processor circuitry 904A may access a communication protocol stack 936 in the memory/storage 912 to communicate over a 3GPP compatible network. In general, the baseband processor circuitry 904A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 908.

The baseband processor circuitry 904A may generate or process baseband signals or waveforms that carry information in 3GPP-compatible networks. In some embodiments, the waveforms for NR may be based cyclic prefix OFDM (CP-OFDM) in the uplink or downlink, and discrete Fourier transform spread OFDM (DFT-S-OFDM) in the uplink.

The memory/storage 912 may include one or more non-transitory, computer-readable media that includes instructions (for example, communication protocol stack 936) that may be executed by one or more of the processors 904 to cause the UE 900 to perform various operations described herein. The memory/storage 912 may also store power control configuration information to be accessed in the uplink power control processes described elsewhere.

The memory/storage 912 include any type of volatile or non-volatile memory that may be distributed throughout the UE 900. In some embodiments, some of the memory/storage 912 may be located on the processors 904 themselves (for example, L1 and L2 cache), while other memory/storage 912 is external to the processors 904 but accessible thereto via a memory interface. The memory/storage 912 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 908 may include transceiver circuitry and radio frequency front module (RFEM) that allows the UE 900 to communicate with other devices over a radio access network. The RF interface circuitry 908 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 926 and proceed to filter and amplify (with a low-noise amplifier) the signal. The signal may be provided to a receiver of the transceiver that down-converts the RF signal into a baseband signal that is provided to the baseband processor of the processors 904.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 926.

In various embodiments, the RF interface circuitry 908 may be configured to transmit/receive signals in a manner compatible with NR access technologies.

The antenna 926 may include antenna elements to convert electrical signals into radio waves to travel through the air and to convert received radio waves into electrical signals. The antenna elements may be arranged into one or more antenna panels. The antenna 926 may have antenna panels that are omnidirectional, directional, or a combination thereof to enable beamforming and multiple input, multiple output communications. The antenna 926 may include microstrip antennas, printed antennas fabricated on the surface of one or more printed circuit boards, patch antennas, phased array antennas, etc. The antenna 926 may have one or more panels designed for specific frequency bands including bands in FR1 or FR2.

The user interface circuitry 916 includes various input/output (I/O) devices designed to enable user interaction with the UE 900. The user interface 916 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 920 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 922 may include software and hardware elements that operate to control particular devices that are embedded in the UE 900, attached to the UE 1100, or otherwise communicatively coupled with the UE 900. The driver circuitry 922 may include individual drivers allowing other components to interact with or control various input/output (I/O) devices that may be present within, or connected to, the UE 900. For example, driver circuitry 922 may include a display driver to control and allow access to a display device, a touchscreen driver to control and allow access to a touchscreen interface, sensor drivers to obtain sensor readings of sensor circuitry 920 and control and allow access to sensor circuitry 920, drivers to obtain actuator positions of electro-mechanic components or control and allow access to the electro-mechanic components, a camera driver to control and allow access to an embedded image capture device, audio drivers to control and allow access to one or more audio devices.

The PMIC 924 may manage power provided to various components of the UE 900. In particular, with respect to the processors 904, the PMIC 924 may control power-source selection, voltage scaling, battery charging, or DC-to-DC conversion.

In some embodiments, the PMIC 924 may control, or otherwise be part of, various power saving mechanisms of the UE 900 including DRX as discussed herein.

A battery 928 may power the UE 900, although in some examples the UE 900 may be mounted deployed in a fixed location, and may have a power supply coupled to an electrical grid. The battery 928 may be a lithium ion battery, a metal-air battery, such as a zinc-air battery, an aluminum-air battery, a lithium-air battery, and the like. In some implementations, such as in vehicle-based applications, the battery 928 may be a typical lead-acid automotive battery.

Figure 10:
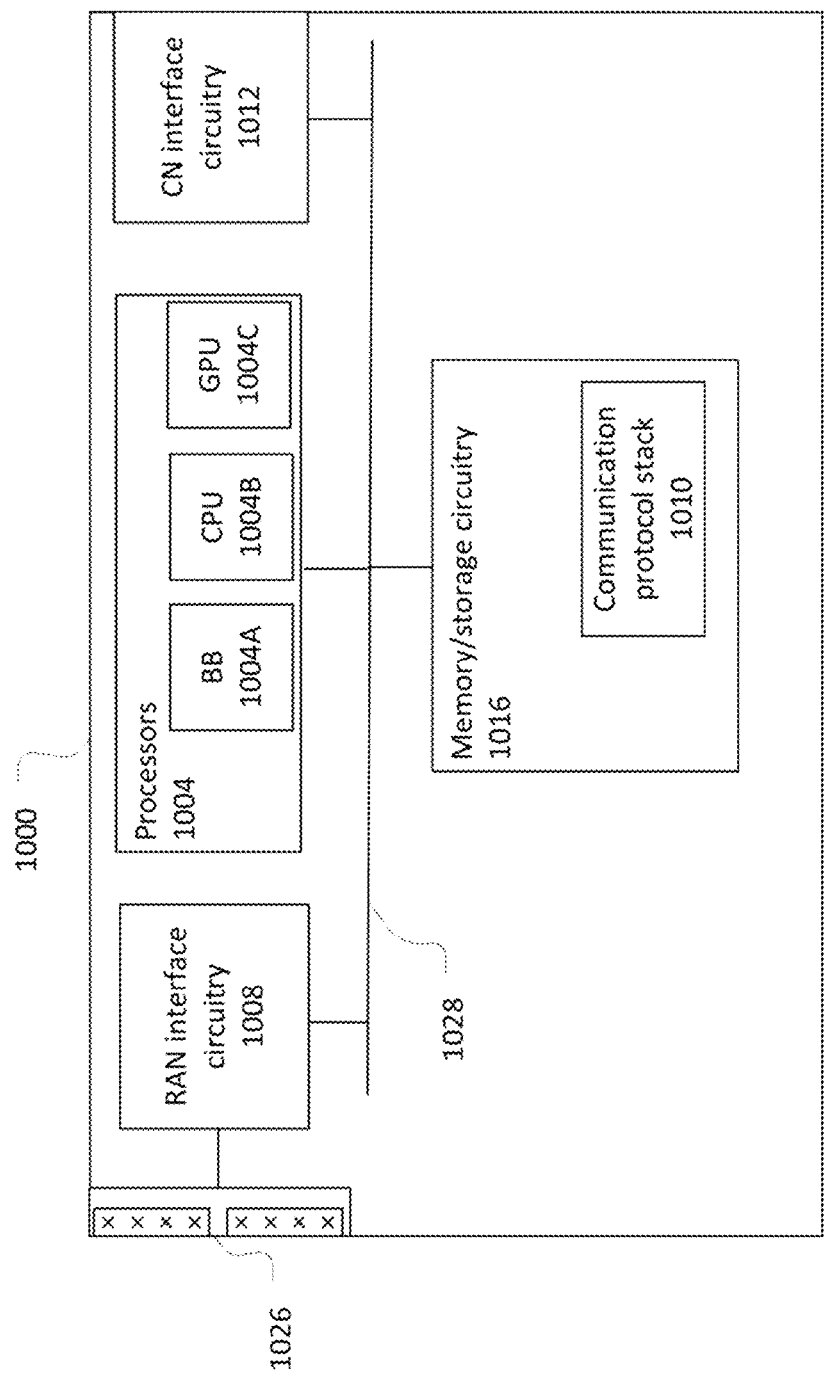
FIG. 10 illustrates a gNB in accordance with some embodiments.

FIG. 10 illustrates a gNB 1000 in accordance with some embodiments. The gNB node 1000 may similar to and substantially interchangeable with base station(s) 108 of FIG. 1.

The gNB 1000 may include processors 1004, RF interface circuitry 1008, core network "CN" interface circuitry 1012, memory/storage circuitry 1016, and antenna structure 1026.

The components of the gNB 1000 may be coupled with various other components over one or more interconnects 1028.

The processors 1004, RF interface circuitry 1008, memory/storage circuitry 1016 (including communication protocol stack 1010), antenna structure 1026, and interconnects 1028 may be similar to like-named elements shown and described with respect to FIG. 10.

The CN interface circuitry 1012 may provide connectivity to a core network, for example, a $5^{th}$ Generation Core network "5GC" using a 5GC-compatible network interface protocol such as carrier Ethernet protocols, or some other suitable protocol. Network connectivity may be provided to/from the gNB 1000 via a fiber optic or wireless backhaul. The CN interface circuitry 1012 may include one or more dedicated processors or FPGAs to communicate using one or more of the aforementioned protocols. In some implementations, the CN interface circuitry 1012 may include multiple controllers to provide connectivity to other networks using the same or different protocols.

In some embodiments, the gNB 1000 may be coupled with TRPs, such as TRPs 102 or 106, using the antenna structure 1026, CN interface circuitry, or other interface circuitry.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating a UE, the method comprising: receiving, from a base station, power control configuration information for communications within a frequency range of 410 megahertz, MHz, to 7125 MHz; selecting first power control parameters from the power control configuration information to be used for a first repetition of a physical uplink control channel, PUCCH, transmission; selecting second power control parameters from the power control configuration information to be used for a second repetition of the PUCCH transmission; transmitting the first repetition of the PUCCH transmission with the first power control parameters applied to a first beam; and transmitting the second repetition of the PUCCH transmission with the second power control parameters applied to a second beam.

Example 2 may include the method of example 1 or some other example herein, wherein the power control configuration information is to configure a P0 set and a plurality of pathloss reference signals, RSs; the first power control parameters include a first P0 from the P0 set and a first pathloss RS from the plurality of pathloss RSs; and the second power control parameters include a second P0 from the P0 set and a second pathloss RS from the plurality of pathloss RSs.

Example 3 may include the method of example 1 or some other example herein, wherein the power control configuration information is to configure first and second P0 sets and a first and second plurality of pathloss reference signals, RSs; the first power control parameters include a first P0 from the first P0 set and a first pathloss RS from the first plurality of pathloss RSs; and the second power control parameters include a second P0 from the second P0 set and a second pathloss RS from the second plurality of pathloss RSs.

Example 4 may include the method of example 1 or some other example herein, further comprising: detecting that a plurality of closed-loop power control processes are enabled for PUCCH; and applying a first closed-loop power control process to the first repetition of the PUCCH transmission; and applying a second closed-loop power control process to the second repetition of the PUCCH transmission.

Example 5 may include the method of example 1 or some other example herein, wherein the UE is to receive the power control configuration information in a PUCCH power control information element, IE, by radio resource control signaling.

Example 6 may include the method of example 1 or some other example herein, wherein the power control configuration information is to configure at least two power control, PC, parameter sets and the method further comprises: mapping the at least two PC parameter sets to a plurality of repetitions of the PUCCH transmission based on a cyclical mapping pattern or a sequential mapping pattern, wherein the cyclical mapping pattern is to cycle PC parameter sets mapped to consecutive repetitions and the sequential mapping pattern is to map individual PC parameter sets to consecutive repetitions.

Example 7 may include the method of example 1 or some other example herein, further comprising: receiving the power control configuration information as a configuration of a PUCCH resource by radio resource control, RRC, signaling or media access control, MAC, control element, CE.

Example 8 may include the method of example 7 or some other example herein, further comprising: receiving the power control configuration information by MAC CE to configure one or more power control parameters for the PUCCH resource or a group of PUCCH resources that includes the PUCCH resource.

Example 9 may include the method of example 8 or some other example herein, further comprising: receiving the MAC CE in a first serving cell and the MAC CE is to configure the one or more power control parameters for the PUCCH resource or the group of PUCCH resources for a second serving cell or a plurality of serving cells in a serving cell list configured by RRC signaling.

Example 10 may include the method of example 7 or some other example herein, further comprising: receiving an initial configuration of power control parameters via RRC signaling; and receiving the power control configuration information by MAC CE to update one or more power control parameters for the PUCCH resource or a group of PUCCH resources that includes the PUCCH resource.

Example 11 may include the method of example 7 or some other example herein, wherein the PUCCH resource is a first PUCCH resource and the method further comprises: receiving the power control configuration information as a configuration of both the first and second PUCCH resources; and receiving an instruction, from a base station, to transmit same uplink control information in both the first and second PUCCH resources.

Example 12 may include the method of example 7 or some other example herein, further comprising: receiving the power control configuration information as a configuration of a plurality of power control parameter sets; and further receiving an indication of at least one of the plurality of power control parameter sets via downlink control information, DCI, signaling.

Example 13 may include a method of operating a UE, the method comprising: storing a plurality of power control parameters; encoding uplink control information, UCI, to be transmitted in a plurality of hops for a physical uplink control channel, PUCCH, resource within one slot; transmitting a first hop of the plurality of hops using first power control parameters from the plurality of power control parameters; and transmitting a second hop of the plurality of hops using the first power control parameters or second power control parameters from the plurality of power control parameters.

Example 14 may include the method of example 13 or some other example herein, further comprising: receiving first power control parameters in a first spatial relation configuration; and receiving the second power control parameters in a second spatial relation configuration.

Example 15 may include the method of example 13 or some other example herein, wherein the first power control parameters are a common set of power control parameters and the method further comprises transmitting the first and second hop using the common set of power control parameters.

Example 16 may include the method of example 13 or some other example herein, further comprising: receiving, via control signaling, the first power control parameters, wherein the control signaling includes a radio resource control signaling, media access control element signaling or downlink control information signaling; and transmitting both the first and second hop using the first power control parameters.

Example 17 may include the method of example 13 or some other example herein, wherein the plurality of power control parameters are for communications within a frequency range of 410 megahertz, MHz, to 7125 MHz and the method further comprises: selecting the first power control parameters from a first set of power control parameters that is associated with the first hop; and selecting the second power control parameters from a second set of power control parameters that is associated with the second hop.

Example 18 may include a method of operating a base station, the method comprising: generating one or more downlink control information, DCI, to schedule a plurality of repetitions of a physical uplink control channel, PUCCH, transmission and to include a power control, TPC, command, wherein the plurality of repetitions of the PUCCH transmission are associated with one or more closed-loop power control processes and the TPC command is to adjust uplink power associated with the one or more closed-loop power control processes; transmitting the one or more DCI to a user equipment, UE; and receiving at least one repetition of the plurality of repetitions.

Example 19 may include the method of example 18 or some other example herein, wherein the plurality of repetitions are associated with one closed-loop power control process and the TPC command is to be applied to all the plurality of repetitions.

Example 20 may include the method of example 18 or some other example herein, wherein the one or more closed-loop power control processes includes a first process and a second process, a first repetition of the plurality of repetitions is associated with the first process, a second repetition of the plurality of repetitions is associated with the second process, and the method further comprises: transmitting, to the UE, an instruction to apply the TPC command to the first repetition using radio resource control signaling, a media access control, MAC, control element, CE, or downlink control information.

Example 21 may include the method of example 18 or some other example herein, wherein the one or more closed-loop power control processes includes a first process and a second process, a first repetition of the plurality of repetitions is associated with the first process, a second repetition of the plurality of repetitions is associated with the second process, and the TPC command is to instruct the UE to adjust an uplink transmit power of the first and second repetitions with a common adjustment value.

Example 22 may include the method of example 18 or some other example herein, wherein the one or more closed-loop power control processes includes a first process and a second process, a first repetition of the plurality of repetitions is associated with the first process, a second repetition of the plurality of repetitions is associated with the second process, and the TPC command is to instruct the UE to adjust an uplink transmit power of the first repetitions with a first adjustment value and to adjust an uplink transmit power of the second repetition with a second adjustment value.

Example 23 may include the method of example 22 or some other example herein, wherein the TPC command includes at least two bits to reference one of a plurality of power adjustment pairs that are predefined or configured by a media access control, MAC, control element, CE.

Example 24 may include an apparatus comprising means to perform one or more elements of a method described in or related to any of examples 1-23, or any other method or process described herein.

Example 25 may include one or more non-transitory computer-readable media comprising instructions to cause an electronic device, upon execution of the instructions by one or more processors of the electronic device, to perform one or more elements of a method described in or related to any of examples 1-23, or any other method or process described herein.

Example 26 may include an apparatus comprising logic, modules, or circuitry to perform one or more elements of a method described in or related to any of examples 1-23, or any other method or process described herein.

Example 27 may include a method, technique, or process as described in or related to any of examples 1-23, or portions or parts thereof.

Example 28 may include an apparatus comprising: one or more processors and one or more computer-readable media comprising instructions that, when executed by the one or more processors, cause the one or more processors to perform the method, techniques, or process as described in or related to any of examples 1-23, or portions thereof.

Example 29 may include a signal as described in or related to any of examples 1-23, or portions or parts thereof.

Example 30 may include a datagram, information element, packet, frame, segment, PDU, or message as described in or related to any of examples 1-23, or portions or parts thereof, or otherwise described in the present disclosure.

Example 31 may include a signal encoded with data as described in or related to any of examples 1-23, or portions or parts thereof, or otherwise described in the present disclosure.

Example 32 may include a signal encoded with a datagram, IE, packet, frame, segment, PDU, or message as described in or related to any of examples 1-23, or portions or parts thereof, or otherwise described in the present disclosure.

Example 33 may include an electromagnetic signal carrying computer-readable instructions, wherein execution of the computer-readable instructions by one or more processors is to cause the one or more processors to perform the method, techniques, or process as described in or related to any of examples 1-23, or portions thereof.

Example 34 may include a computer program comprising instructions, wherein execution of the program by a processing element is to cause the processing element to carry out the method, techniques, or process as described in or related to any of examples 1-23, or portions thereof.

Example 35 may include a signal in a wireless network as shown and described herein.

Example 36 may include a method of communicating in a wireless network as shown and described herein.

Example 37 may include a system for providing wireless communication as shown and described herein.

Example 38 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed, cause processing circuitry to:
   process power control configuration information received from a base station, the power control configuration information for communications within a frequency range of 410 megahertz (MHz) to 7125 MHz;
   select first power control parameters from the power control configuration information to be used for a first repetition of a physical uplink control channel (PUCCH) transmission;
   select second power control parameters from the power control configuration information to be used for a second repetition of the PUCCH transmission;
   generate the first repetition of the PUCCH transmission with the first power control parameters; and
   generate the second repetition of the PUCCH transmission with the second power control parameters.

2. The one or more non-transitory computer-readable media of claim 1, wherein the power control configuration information is to configure a P0 set and a plurality of pathloss reference signals (RSs); the first power control parameters include a first P0 from the P0 set and a first pathloss RS from the plurality of pathloss RSs; and the second power control parameters include a second P0 from the P0 set and a second pathloss RS from the plurality of pathloss RSs.

3. The one or more non-transitory computer-readable media of claim 1, wherein the power control configuration information is to configure first and second P0 sets and a first and second plurality of pathloss reference signals (RSs); the first power control parameters include a first P0 from the first P0 set and a first pathloss RS from the first plurality of pathloss RSs; and the second power control parameters include a second P0 from the second P0 set and a second pathloss RS from the second plurality of pathloss RSs.

4. The one or more non-transitory computer-readable media of claim 1, wherein the instructions, when executed, further cause the processing circuitry to
   detect that a plurality of closed-loop power control processes are enabled for PUCCH;
   apply a first closed-loop power control process to the first repetition of the PUCCH transmission; and
   apply a second closed-loop power control process to the second repetition of the PUCCH transmission.

5. The one or more non-transitory computer-readable media of claim 1, wherein the processing circuitry is to receive the power control configuration information in a PUCCH power control information element (IE) by radio resource control signaling.

6. The one or more non-transitory computer-readable media of claim 1, wherein the power control (PC) configuration information is to configure at least two PC parameter sets and the instructions, when executed, further cause the processing circuitry to:
map the at least two PC parameter sets to a plurality of repetitions of the PUCCH transmission based on a cyclical mapping pattern or a sequential mapping pattern, wherein the plurality of repetitions include the first repetition and the second repetition, the cyclical mapping pattern is to cycle PC parameter sets mapped to consecutive repetitions, and the sequential mapping pattern is to map individual PC parameter sets to consecutive repetitions.

7. The one or more non-transitory computer-readable media of claim 1, wherein the instructions, when executed, further cause the processing circuitry to receive the power control configuration information as a configuration of a PUCCH resource by radio resource control (RRC) signaling or media access control (MAC) control element (CE).

8. The one or more non-transitory computer-readable media of claim 1, wherein the processing circuitry is to receive a media access control (MAC) control element (CE) in a first serving cell, wherein the MAC CE is to configure one or more power control parameters for a PUCCH resource or a group of PUCCH resources for a second serving cell or a plurality of serving cells in a serving cell list configured by radio resource control (RRC) signaling.

9. The one or more non-transitory computer-readable media of claim 1, wherein the processing circuitry is to:
receive the power control configuration via radio resource control (RRC) signaling, the power control configuration to configure a plurality of power control parameters; and
receive media access control (MAC) control element (CE) to activate the first power control parameters and the second power control parameters from the plurality of power control parameters.

10. The one or more non-transitory computer-readable media of claim 1, wherein the instructions, when executed, further cause the processing circuitry to receive the power control configuration information as a configuration of a plurality of power control parameter sets; and further receive an indication of at least one of the plurality of power control parameter sets via downlink control information (DCI) signaling.

11. An apparatus comprising:
processing circuitry to:
process power control configuration information received from a base station, the power control configuration information for communications within a frequency range of 410 megahertz (MHz) to 7125 MHz;
select first power control parameters from the power control configuration information to be used for a first repetition of a physical uplink control channel (PUCCH) transmission;
select second power control parameters from the power control configuration information to be used for a second repetition of the PUCCH transmission;
generate the first repetition of the PUCCH transmission with the first power control parameters; and
generate the second repetition of the PUCCH transmission with the second power control parameters; and
interface circuitry coupled with the processing circuitry, the interface circuitry to communicatively couple the processing circuitry with a component of a device.

12. The apparatus of claim 11, wherein the power control configuration information is to configure a P0 set and a plurality of pathloss reference signals (RSS); the first power control parameters include a first P0 from the P0 set and a first pathloss RS from the plurality of pathloss RSs; and the second power control parameters include a second P0 from the P0 set and a second pathloss RS from the plurality of pathloss RSs.

13. The apparatus of claim 11, wherein the power control configuration information is to configure first and second P0 sets and a first and second plurality of pathloss reference signals (RSS); the first power control parameters include a first P0 from the first P0 set and a first pathloss RS from the first plurality of pathloss RSs; and the second power control parameters include a second P0 from the second P0 set and a second pathloss RS from the second plurality of pathloss RSs.

14. The apparatus of claim 11, wherein the power control (PC) configuration information is to configure at least two PC parameter sets and the processing circuitry is further to:
map the at least two PC parameter sets to a plurality of repetitions of the PUCCH transmission based on a cyclical mapping pattern or a sequential mapping pattern, wherein the plurality of repetitions include the first repetition and the second repetition, the cyclical mapping pattern is to cycle PC parameter sets mapped to consecutive repetitions, and the sequential mapping pattern is to map individual PC parameter sets to consecutive repetitions.

15. The apparatus of claim 11, wherein the processing circuitry is further to:
receive the power control configuration via radio resource control (RRC) signaling, the power control configuration to configure a plurality of power control parameters; and
receive a media access control (MAC) control element (CE) to activate the first power control parameters and the second power control parameters from the plurality of power control parameters.

16. A method comprising:
generating power control configuration information for communications within a frequency range of 410 megahertz (MHz) to 7125 MHz;
generating a first indication of first power control parameters from the power control configuration information that is to be used for a first repetition of a physical uplink control channel (PUCCH) transmission;
generating a second indication of second power control parameters from the power control configuration information to be used for a second repetition of the PUCCH transmission; and
generating one or more signals to include the power control configuration, the first indication, and the second indication, the one or more signals to be transmitted to a user equipment.

17. The method of claim 16, wherein the power control (PC) configuration information is to configure at least two PC parameter sets, wherein the at least two PC parameter sets are to be mapped to a plurality of repetitions of the PUCCH transmission based on a cyclical mapping pattern or a sequential mapping pattern, wherein the plurality of repetitions include the first repetition and the second repetition, the cyclical mapping pattern is to cycle PC parameter sets mapped to consecutive repetitions, and the sequential mapping pattern is to map individual PC parameter sets to consecutive repetitions.

18. The method of claim 16, wherein generating the one or more signals comprises:
generating radio resource control (RRC) signaling to transmit the power control configuration, the power control configuration to configure a plurality of power control parameters; and
generating a media access control (MAC) control element (CE) to provide the first indication and the second indication.

19. The method of claim 16, further comprising:
transmitting the one or more signals to the user equipment.

20. The method of claim 16, further comprising:
receiving, from the user equipment, the PUCCH transmission.

21. A method of operating processing circuitry, the method comprising:
processing power control configuration information received from a base station, the power control configuration information for communications within a frequency range of 410 megahertz (MHz) to 7125 MHz;
selecting first power control parameters from the power control configuration information to be used for a first repetition of a physical uplink control channel (PUCCH) transmission;
selecting second power control parameters from the power control configuration information to be used for a second repetition of the PUCCH transmission;
generating the first repetition of the PUCCH transmission with the first power control parameters; and
generating the second repetition of the PUCCH transmission with the second power control parameters.

22. The method of claim 21, wherein the power control configuration information is to configure a P0 set and a plurality of pathloss reference signals (RSS); the first power control parameters include a first P0 from the P0 set and a first pathloss RS from the plurality of pathloss RSs; and the second power control parameters include a second P0 from the P0 set and a second pathloss RS from the plurality of pathloss RSs.

23. The method of claim 21, wherein the power control configuration information is to configure first and second P0 sets and a first and second plurality of pathloss reference signals (RSS); the first power control parameters include a first P0 from the first P0 set and a first pathloss RS from the first plurality of pathloss RSs; and the second power control parameters include a second P0 from the second P0 set and a second pathloss RS from the second plurality of pathloss RSs.

24. The method of claim 21, further comprising:
detecting that a plurality of closed-loop power control processes are enabled for PUCCH;
applying a first closed-loop power control process to the first repetition of the PUCCH transmission; and
applying a second closed-loop power control process to the second repetition of the PUCCH transmission.

25. The method of claim 21, wherein the power control (PC) configuration information is to configure at least two PC parameter sets and the method further comprises:
mapping the at least two PC parameter sets to a plurality of repetitions of the PUCCH transmission based on a cyclical mapping pattern or a sequential mapping pattern, wherein the plurality of repetitions include the first repetition and the second repetition, the cyclical mapping pattern is to cycle PC parameter sets mapped to consecutive repetitions, and the sequential mapping pattern is to map individual PC parameter sets to consecutive repetitions.

26. The method of claim 21, further comprising:
receiving the power control configuration information as a configuration of a PUCCH resource by radio resource control (RRC) signaling or media access control (MAC) control element (CE).

27. The method of claim 21, further comprising:
receiving the power control configuration via radio resource control (RRC) signaling, the power control configuration to configure a plurality of power control parameters; and
receiving media access control (MAC) control element (CE) to activate the first power control parameters and the second power control parameters from the plurality of power control parameters.

28. The method of claim 21, further comprising:
receiving the power control configuration information as a configuration of a plurality of power control parameter sets; and
further receiving an indication of at least one of the plurality of power control parameter sets via downlink control information (DCI) signaling.

* * * * *